United States Patent
Ali et al.

(10) Patent No.: US 9,092,635 B2
(45) Date of Patent: Jul. 28, 2015

(54) METHOD AND SYSTEM OF PROVIDING SECURITY SERVICES USING A SECURE DEVICE

(75) Inventors: Asad Ali, Austin, TX (US); HongQian Karen Lu, Austin, TX (US); Apostol Vassilev, Austin, TX (US); Ed Dolph, Austin, TX (US)

(73) Assignee: Gemalto SA, Meudon (FR)

( * ) Notice: Subject to any disclaimer, the term of this patent is extended or adjusted under 35 U.S.C. 154(b) by 1333 days.

(21) Appl. No.: 12/295,489

(22) PCT Filed: Mar. 30, 2007

(86) PCT No.: PCT/IB2007/000829
§ 371 (c)(1),
(2), (4) Date: Jan. 11, 2010

(87) PCT Pub. No.: WO2007/116277
PCT Pub. Date: Oct. 18, 2007

(65) Prior Publication Data
US 2010/0186076 A1   Jul. 22, 2010

Related U.S. Application Data

(63) Continuation of application No. 11/564,121, filed on Nov. 28, 2006, now abandoned.

(60) Provisional application No. 60/788,400, filed on Mar. 31, 2006.

(51) Int. Cl.
*G06F 21/00* (2013.01)
*G06F 21/60* (2013.01)
(Continued)

(52) U.S. Cl.
CPC .............. *G06F 21/606* (2013.01); *G06F 21/34* (2013.01); *G06Q 20/3229* (2013.01);
(Continued)

(58) Field of Classification Search
CPC ... H04L 9/3234; H04L 9/0877; G06F 21/123; G06F 21/34; G06F 21/77
USPC ........... 713/171; 705/50; 726/9, 14; 380/247; 709/221
See application file for complete search history.

(56) References Cited

U.S. PATENT DOCUMENTS 5,887,063 A    3/1999    Varadharajan et al.
6,084,967 A    7/2000    Kennedy et al.
(Continued)

FOREIGN PATENT DOCUMENTS

WO    WO02093468 A     11/2002
WO    WO2006021865 A1   3/2006

OTHER PUBLICATIONS

Ravi, S.; et al.;"Tamper resistance mechanisms for secure embedded systems";VLSI Design, 2004. Proceedings. 17th International Conference on ;DOI: 10.1109/ICVD.2004.1260985 Publication Year: 2004 , pp. 605-611.*

(Continued)

*Primary Examiner* — Harunur Rashid
*Assistant Examiner* — Angela Holmes
(74) *Attorney, Agent, or Firm* — The Jansson Firm; Pehr B. Jansson

(57) ABSTRACT

A secure portable electronic device for providing secure services when used in conjunction with a host computer. The secure portable device includes a read-only memory partition, a read/write memory partition, and a secure memory partition. The secure portable device includes instructions stored in the read-only partition including a host agent containing instructions executable by the host computer. The secure portable device also includes instructions stored in the secure memory partition. These instructions include a card agent containing instructions executable by central processing units secure portable electronic device, and includes a card agent communications module for communicating with the host agent; and a security module for accessing private information stored in the secure memory partition. The host agent includes a host agent communications module for communicating with the card agent and at least one function requiring use of private information stored in the secure memory partition of the portable device and operable to transmit a request to the card agent to perform a corresponding function requiring the use of private information stored on the portable device.

38 Claims, 14 Drawing Sheets

(51) Int. Cl.
| | |
|---|---|
| *G06F 21/34* | (2013.01) |
| *G06Q 20/32* | (2012.01) |
| *G06Q 20/34* | (2012.01) |
| *G06Q 20/40* | (2012.01) |
| *G07F 7/10* | (2006.01) |
| *G06F 21/12* | (2013.01) |
| *G06F 21/77* | (2013.01) |
| *H04L 29/06* | (2006.01) |

(52) U.S. Cl.
CPC ......... *G06Q 20/341* (2013.01); *G06Q 20/3576* (2013.01); *G06Q 20/40975* (2013.01); *G07F 7/1008* (2013.01); *G06F 21/123* (2013.01); *G06F 21/77* (2013.01); *H04L 63/0853* (2013.01); *H04L 63/166* (2013.01)

(56) References Cited

U.S. PATENT DOCUMENTS

| | | | |
|---|---|---|---|
| 6,084,968 A * | 7/2000 | Kennedy et al. | 380/259 |
| 2002/0078367 A1 | 6/2002 | Lang et al. | |
| 2002/0138549 A1 | 9/2002 | Urien | |
| 2003/0023954 A1 | 1/2003 | Wilkinson et al. | |
| 2003/0110389 A1 | 6/2003 | Elteto | |
| 2003/0217334 A1 * | 11/2003 | Liu et al. | 715/513 |
| 2005/0108532 A1 * | 5/2005 | Bajikar | 713/171 |
| 2005/0209975 A1 | 9/2005 | So et al. | |
| 2006/0085527 A1 | 4/2006 | Phillips et al. | |
| 2006/0085848 A1 * | 4/2006 | Aissi et al. | 726/9 |
| 2006/0242068 A1 | 10/2006 | Jogand-Coulomb et al. | |
| 2007/0016941 A1 | 1/2007 | Gonzalez et al. | |

OTHER PUBLICATIONS

Gebotys, C.H.; et al; "Security wrappers and power analysis for SoC technology";Hardware/Software Codesign and System Synthesis, 2003. First IEEE/ACM/IFIP International Conference on ;DOI: 10.1109/CODESS.2003.1275277 Publication Year: 2003 , pp. 162-167.*

Microsoft Corporation, Microsoft Computer Dictionary, 2002, Encryption, NFS, and Proxy Server. Microsoft Press, 5th Edition.

WebServ USB, ItWorks, Inc., http://www.webservusb.com, 2004.

* cited by examiner

501

| Header (2 bytes) | Payload |

503

| Type (1 Bit) | Type dependent content (15 bits) |

505

| CMP header | CMP payload |

| ALP header | ALP payload |

507

| 0 (1 bit) | Encryption flag (1 bit) | Compress flag (1 bit) | Length of Payload |

509

| 1 (1 bit) | Type (5 bits) | Length (10 bits) |

METHOD AND SYSTEM OF PROVIDING SECURITY SERVICES USING A SECURE DEVICE

CROSS-REFERENCE TO RELATED APPLICATIONS

This application is a PCT National Stage application filed Sep. 30, 2008 of PCT/IB2007/000829 which is a PCT application of U.S. provisional application 60/788,400 filed on 31 Mar. 2006 entitled "Proxy web agent and TLS over mass storage" and U.S. application Ser. No. 11/564,121, which is a non-provisional application claiming priority from provisional application Ser. No. 60/788,400, the teachings of which are incorporated by reference herein as if reproduced in full below.

BACKGROUND OF THE INVENTION

The present invention relates generally to provision of security services to Internet applications and more particularly to provision of security services to Internet applications from a smart card without requiring a smart card infrastructure.

Smart cards are devices that may be used to provide high levels of security for information stored thereon. As such, smart cards are ideally suited for storing sensitive information needed in many applications. A simple illustrative example is online banking. Typically, access to bank accounts over the Internet requires a user to enter an account number and a password. It is entirely possible to store both of these pieces of information on a smart card. However, that begs the question of how to use the account number and password stored on the smart card when logging in to a bank web site.

Current smart card solutions require both specialized hardware in the form of card readers, device drivers and middleware applications. This infrastructure has to be installed on the host computer and configured by a user with administrative rights before the solution can be used by restricted user-mode accounts. This more than any other single factor has hindered mass deployment of smart cards for desktop applications.

While there are specialized smart cards that use standard peripheral connectors thus avoiding the requirement of special card readers, e.g., the eGate smart card from Axalto, Inc, hitherto these cards lack the capability to connect to the Internet and act as Internet hosts without installation of drivers and middleware on the host computers to which they are to be connected. That installation would require the account doing the installation to have administrative rights.

There are also smart cards that provide network capabilities, e.g., the Axalto Network Card, described in co-assigned co-pending patent application Ser. No. 10/848,738, by Hong-Qian Karen Lu, et al, entitled "Secure networking using a resource-constrained device," filed on 19 May 2004, the entire disclosure of which is incorporated herein by reference. While such smart cards may act as network nodes and peers with other computers connected to a network, these cards require a certain amount of software installation and/or configuration on computers or other devices that interface the cards to the network. However, even with the support of a network connectivity stack on the smart card, the current PC infrastructure cannot support smart cards in restricted user accounts.

From the foregoing it will be apparent that there is still a need for an improved method to provide security services such as those available from smart cards without imposing the burden of installation of hardware and software on the host computer there by overcoming foresaid problem of limiting acceptance of such security devices due to imposition of special hardware and software on the host computer.

SUMMARY OF THE INVENTION

In a preferred embodiment, the invention provides a system and method for use of smart cards to provide security services without imposing the overhead of driver and/or middleware installations requiring administrative rights on a host computer or special hardware not normally found on end-user computers. The invention is easily deployed in conjunction with computers having commonly encountered system software and hardware. There is no need for special middleware or hardware because of the capabilities provided via firmware installed in the device and transferred automatically to the host computer to which it is connected.

A secure portable electronic device for providing secure services when used in conjunction with a host computer having a central processing unit of a first type, the secure portable electronic device having a central processing unit of a second type, wherein a secure service is provided by executing an application in a flexible distributed fashion among the host computer and the secure portable electronic device. The secure portable device includes a read-only memory partition, a read/write memory partition, and a secure memory partition. Further, the secure portable device includes a communications interface for transmitting and receiving data between the host computer and the secure portable electronic device using a communications protocol over the communications interface. The secure portable device includes instructions stored in the read-only partition. These instructions include a host agent containing instructions executable by central processing units of the first type. The secure portable device also includes instructions stored in the secure memory partition. These instructions include a card agent containing instructions executable by central processing units of the second type, and includes a card agent communications module for communicating with the host agent; and a security module for accessing private information stored in the secure memory partition. The host agent includes a host agent communications module for communicating with the card agent and at least one function requiring use of private information stored in the secure memory partition of the portable device and operable to transmit a request to the card agent to perform a corresponding function requiring the use of private information stored on the portable device.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
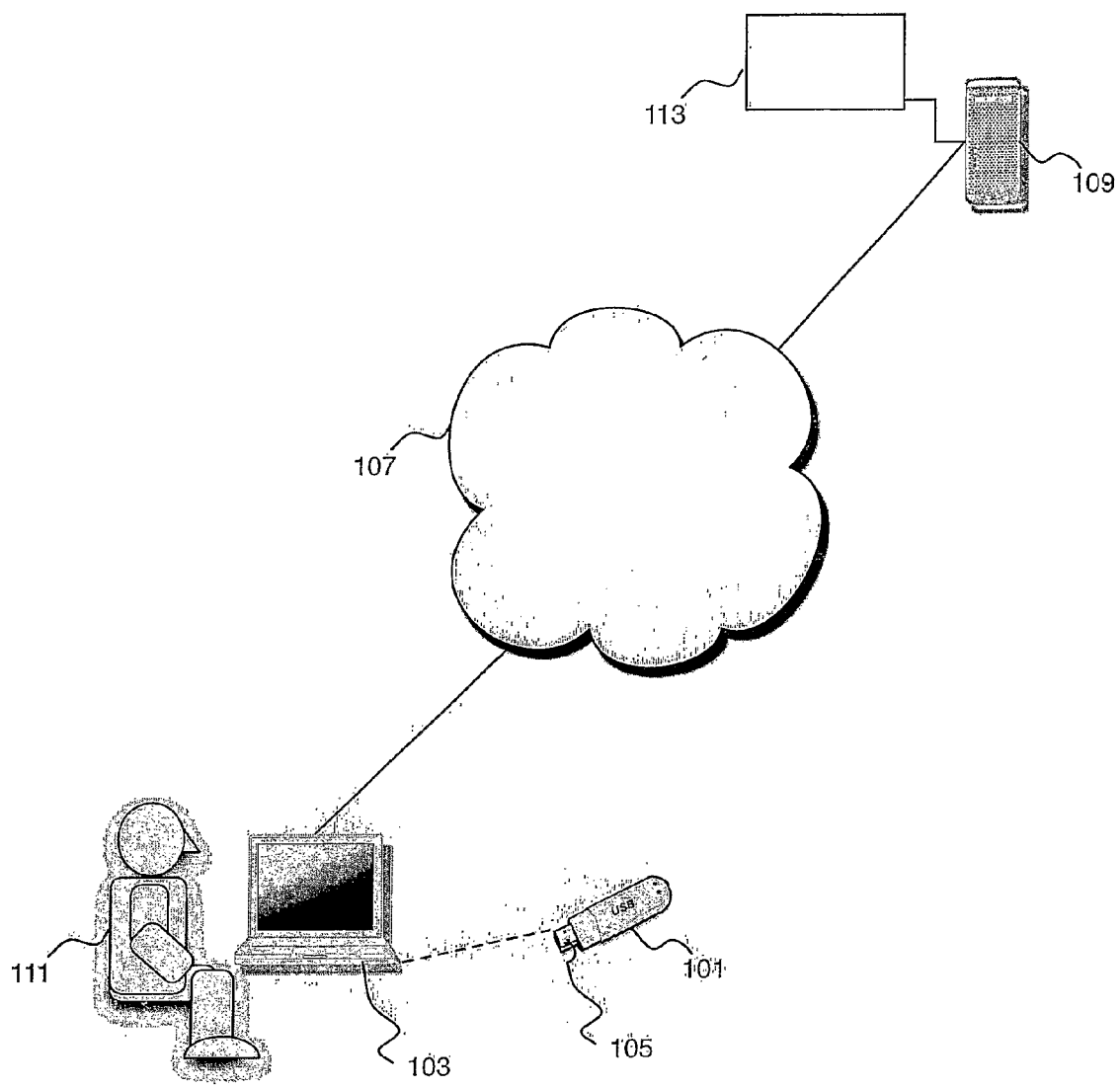
FIG. 1 is a block diagram illustrating an example scenario in which a smart card is used to access services on a remote server.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

A security device according to the invention provides a self-contained infrastructure that is automatically shared with a host computer to which the security device is connected. The security device, hereinafter, for illustrative purposes, a smart card, is configured to be connected to a host computer using a standard peripheral connection and to behave as a device normally connected to such a standard peripheral connection. The smart card communicates with the host computer using the communications protocol associated with the standard peripheral connection. In a preferred embodiment, that connection is a Universal Serial Bus (USB) connection and the smart card appears to the host computer as a USB mass storage device. As such, the smart card communicates with the host computer using the USB mass storage protocol. Upon connecting the security device to a host computer, a special program, the host-agent, stored on the smart card, is automatically launched on the host computer. In conjunction with launching the host-agent on the host computer, a corresponding program, the card-agent, is launched on the smart card. The host-agent and card-agent communicate over a special communications protocol for providing secure communications there between. That special communications protocol is carried over the USB mass storage protocol.

By providing a standard hardware interface, one that is available on virtually every modern computer, and by communicating over a standard protocol, while providing the host-agent and card-agent functionality, a smart card according to the invention, may provide a hitherto unavailable advantage of providing the security functionality of a smart card without requiring any special hardware or software on the host computer. Thus, a person carrying such a smart card may achieve the hitherto unavailable advantage of connecting that smart card to virtually any computer, e.g., one provided in a public place, a friend or co-worker's computer, or even, a totally untrusted computer, and achieve a secure communication between the smart card and a remote service. Availability of such smart cards makes new uses of smart cards possible because there is no longer a requirement of a special card reader or middleware.

Introduction

FIG. 1 is a block diagram illustrating an example scenario in which a smart card is used to access services on a remote server. A smart card 101 is connected to a host computer 103 using a standard connector 105. The host computer 103, in turn, is connected to a network 107, e.g., the Internet. At a remote location on the network 107, a server computer 109 is connected. A user 111, for example, the owner of the smart card 101, wishes to access a service 113 provided by the server 109. Consider, as an example, that the service 113 requires the user 111 to identify himself using a PIN. The user 111 (or a service provider) has previously stored the user's PIN on the smart card 101. If the user 111 cannot trust the computer 103, there is a risk that the computer 103 would capture the PIN, if the user merely types in the PIN using the keyboard of the computer 103. Alternatively, the user can direct the smart card 101 to transmit the PIN directly to the remote service 113. That also is problematic. Malware installed on the computer 103 or elsewhere on the path between the smart card 101 and the remote service 113 may capture the PIN by snooping on the communication.

As will be discussed in greater detail below, in one embodiment of the invention, the PIN is securely transmitted to the remote service over a secure communications channel. No special hardware or software is required to be preinstalled on the remote server 109, the host computer 103, or anywhere along the path between the smart card 101 and the remote service 113.

Figure 2:
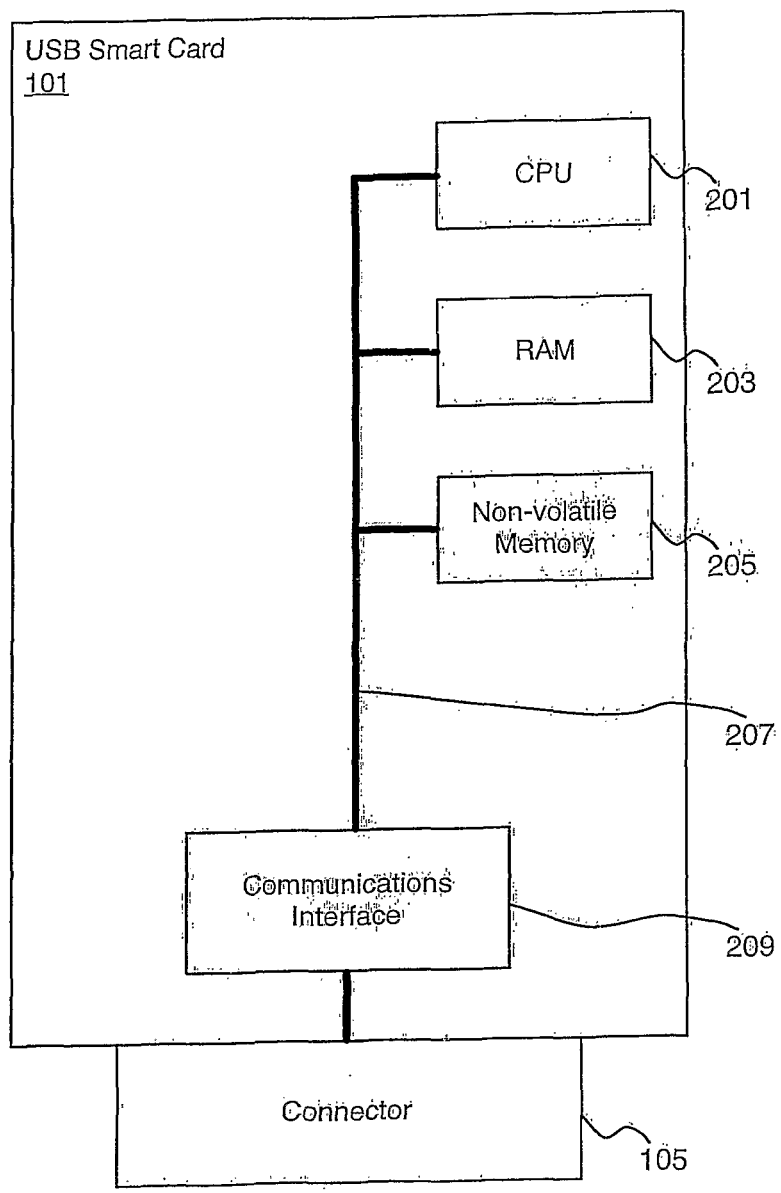
FIG. 2 is a block diagram illustrating a high-level view of the architecture of a smart card of FIG. 1.

FIG. 2 is a block diagram illustrating a high-level view of the architecture of a smart card 101. As illustrated in FIG. 1, the smart card 101 is equipped with a standard peripheral hardware connector 105, e.g., a USB connector. The smart card 101 contains a central processing unit 201, a RAM 203, and a non-volatile memory 205. These components are connected via a bus 207. Also connected to the bus 207 is a communications hardware interface 209 for providing a connection between the bus 207, and consequently, the CPU 201, RAM 203, and non-volatile memory 205, and the connector 105.

Figure 3:
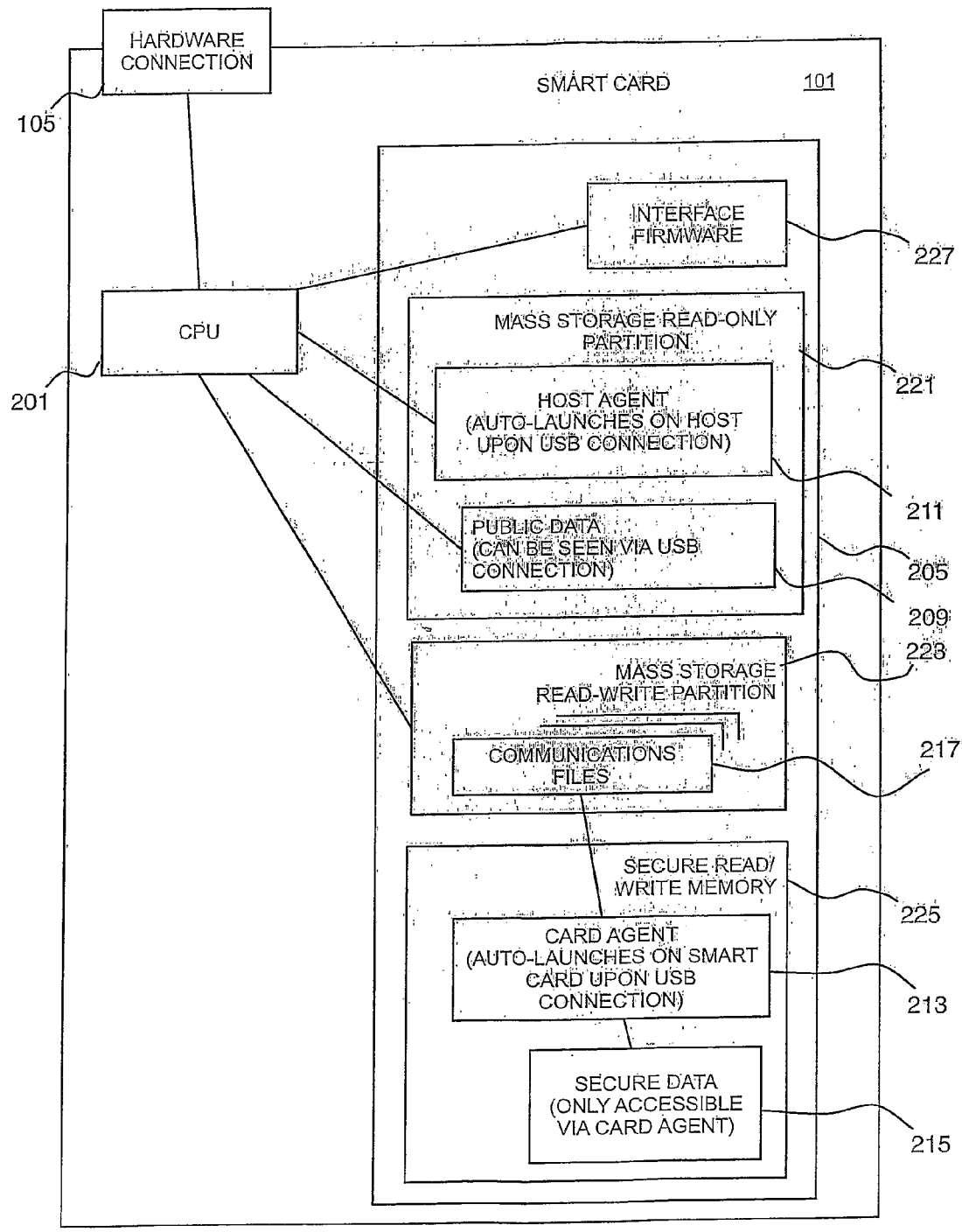
FIG. 3 is a block diagram illustrating the architectural organization of programs over the hardware components of the smart card FIG. 2, including illustrating a host agent and card agent both stored in memory of the smart card.

FIG. 3 is a block diagram illustrating the architectural organization of programs over the hardware components of the smart card 101. The hardware connection between the smart card 101 and the host computer 103 is achieved using the hardware connector 105. The communication on the hardware connection uses the USB mass storage protocol. The CPU 201, executing an interface firmware module 227, which is stored as firmware on the smart card 101, manages that communication. As such, the interface module is located in the non-volatile memory 205 or in Read Only Memory (ROM). The interface firmware module 227 implements the USB mass storage protocol such that the host computer 103 perceives the smart card 101 to be a USB mass storage device.

The non-volatile memory 205 of the smart card 101 contains three areas: a mass storage read-only partition 221, a mass storage read-write partition 223, and a secure read/write memory 225. The mass storage read-only partition 221 and the mass storage read-write partition 223 are accessible from external devices, e.g., the host computer 103. However, while external devices, e.g., host computer 103, can write to the read-write partition 205, in one embodiment, the read-only partition may be written to by the CPU 201 of the smart card 101, i.e., the read-only partition 203 is read-only with respect to external devices, but not necessarily to the smart card 101. Conversely, the secure read/write memory 225 may not be accessed directly from external devices for either read or write operations. Because all interactions are managed by the interface firmware 227, the interface firmware 227 can control access to various parts of the non-volatile memory 205 or files stored in the non-volatile memory 205 so that, for example, only the card agent 213 can access the secure data 215 (described herein below).

The mass storage read-only partition 221 contains public data 209 that may be accessed from any host computer to which the smart card 101 may be connected. The mass storage read-only partition 221 also contains a program, the host-agent 211, which is auto-launched on the host computer 103 when the smart card 101 is connected to the host computer 103 via the hardware connection 105. The USB mass storage standard provides that a USB mass storage device may include a trigger file called autorun.inf that is a script that automatically is executed when the device is connected to a host. Table I is a code example of one possible autorun.inf file to launch the host-agent 211:

TABLE 1

Example Autorun.inf to launch the host-agent 211.

[autorun]
shellexecute=hagent_r.exe
action=Launch the Network Card Host Agent
label=NetCard Host
UseAutoPlay=0

When a user 111 inserts the smart card 101 into the appropriate slot on a host computer 103, the operating system (e.g., Microsoft Windows) displays a dialog box allowing the user 111 to select the action "Launch the Network Card Host Agent". If the user 111 accepts that action, the host-agent 211 ("hagent_r.exe" in the example code) is executed by the host computer 103.

The secure read/write memory 225 contains a module called the card-agent 213. The smart card 101 is configured such that, when the smart card 101 is connected to a host computer 103, i.e., when a USB connection has been established between the smart card 101 and the host computer 103, the CPU 201 launches (i.e., executes) the card-agent 213. As described in greater detail below, in one embodiment, the card-agent 213 is the only program through which certain secure data 215 may be accessed.

Typically a USB mass storage device is used to store data files. USB memory sticks are one example of a USB mass storage device. A USB memory stick functions as a very compact and easily transportable non-volatile storage device. A user uses such a device to store data files.

The mass storage files are files with public access that are exposed by the smart card 101 and visible from the host computer 103. The host agent 211 has direct access to these files. Examples of these files can be HTML, image, JavaScript, CSS files, as well as public key certificates. All files visible through the mass storage interface are read-only files for the host computer 103. The only exception is a set of communications files 217 in the mass storage read-write partition 223; for example, according to one embodiment of the invention, the communication channel between the host agent 211 and the card agent 213 is based of mass storage files. These files are read-write files.

Thus, to achieve a communication according to the USB mass storage protocol between the card-agent 213 and the host-agent 211, when the host-agent 211 is executing on the host computer 103, the card-agent 213 and host-agent 211 writes communication data files 217 in the mass storage read-write partition 223. The nature of that communication is described in greater detail herein below.

Figure 4:
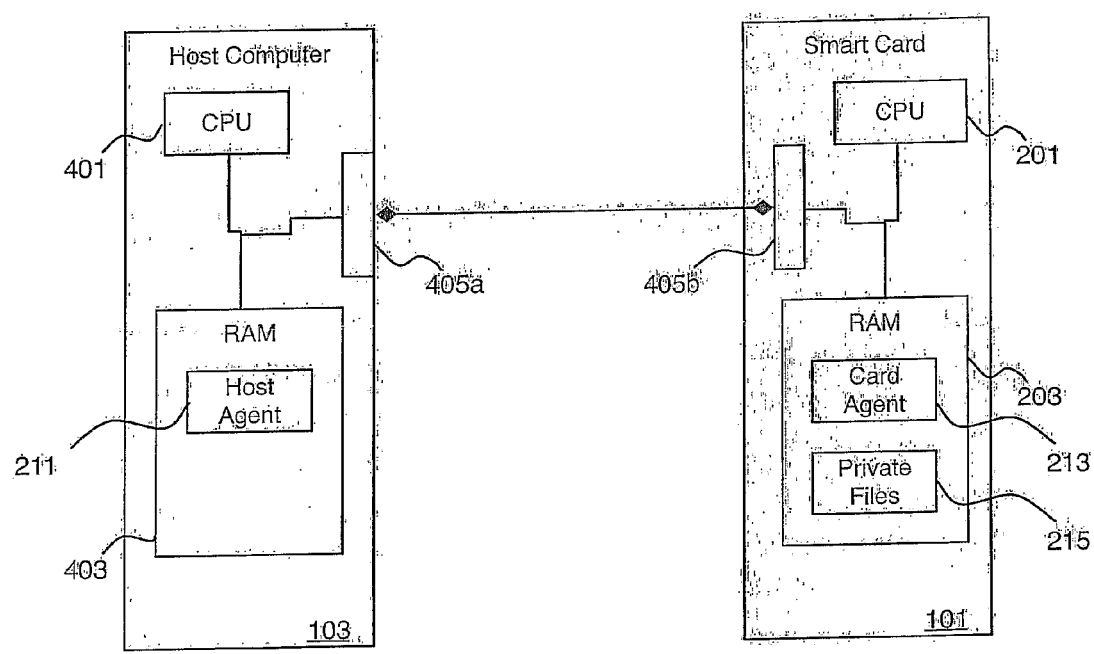
FIG. 4 is a block diagram illustrating the loading of the host-agent of FIG. 3 into Random Access Memory (RAM) of the host computer to which the smart card is connected.

FIG. 4 is a block diagram illustrating the loading of the host-agent 211 into the RAM 403 of the host computer 103. The CPU 401 of the host-computer 103, then executes the host-agent 211. The host agent 211 communicates with the card-agent 213, which is loaded in the RAM 203 of the smart card 101 and executed by the CPU 201 of the smart card 101. Through the card agent 213, the host agent 211 has access to private files 215 that are stored on the smart card 101. Communication between the host agent 211 and the card agent 213 is performed via the host-side USB mass storage interface 405a and the card-side USB mass storage interface 405b (collectively, 405).

The architecture illustrated in FIGS. 1-4 provides a framework in which a smart card 101 can provide security and convenience of services for Internet applications. In one embodiment, the components involved rely solely on the USB mass storage interface for connectivity and do not require the smart card 101 to implement networking protocols, such as TCP/IP, DHCP server, or DNS server, in order to provide services. The architecture avoids the burden of implementing a network communications stack, DHCP server, or a DNS server on the smart card 101. In one class of solutions using a smart card 101, as described herein, dealing with authentication and secure Internet access, the smart card 101 may include the following components:

A smart card 101, capable of enumerating as a USB mass storage device and having an internal secure file system.
SSL/TLS library, in client and server mode
OATH, etc. for OTP
HTTPS web server
HTTPS agent
Application programs The smart card 101 enumerates as a USB mass storage device and contains a private file system 215. The components used for providing security services may be split between the host computer 103 and the smart card 101. These components are divided between the smart card 101 and the host computer 103 into two main logical pieces, namely, those provided by the host agent 211 and those provided by the card agent 213. All functionality provided by connecting the smart card 101 is contained in these two main components, divided judiciously to suit a particular preference for security vs. performance trade-off. The two agents communicate with each other using a mass storage interface as an I/O channel. In one embodiment, the communication is encrypted by the two agents 211 and 213 to prevent access by a third party along a communications path from the smart card 101 to a remote server 109.

The actual division of workload between host agent 211 and card agent 213 is driven by the security versus performance considerations. On one end of the security/performance spectrum, the card agent 213 contains implementation of all the security components provided through the smart card 101 and the host agent 211 merely acts as a thin proxy. That solution is a very secure solution but may not have acceptable performance for certain classes of applications. On the other end of the spectrum all features are run on the host computer 103. That solution has excellent performance characteristics but offers little in way of security. The architecture provided herein offers flexibility in defining the right balance between security and performance. One embodiment is described herein below as one possible example of a division of tasks between the card agent 213 and the host agent 211 where performance is significantly improved with very little compromise in regard to security.

Design Example

This section describes one example of the split of functionality between the host agent 211 and the card agent 213. The host agent 211 implements an HTTPS web server and web agent, as well as part of the TLS protocol. The card agent 213 responds to service requests from the host agent 211. The card agent 211 is used for the most cryptographically sensitive part of the TLS protocol, and for handling confidential user data. The design is explained using three common scenarios.

1.1. TLS Server Handshake

In one use of the invention, the host agent 213 establishes a secure HTTP connection to a web browser, e.g., a TLS connection. One step of establishing such a connection is to perform a TLS handshake. The TLS handshake sets up the session keys that secure the connection. After the TLS connection has been established, a user can interact securely with the smart card.

In the example scenario, the host agent 211 acts as a web server. The client of the web server is a web browser on the host computer 103. While a complete TLS handshake involves a series of messages between the server and client, the only two handshake messages that are relevant to the role of host agent 211 and card agents 213 of the present invention are the following:

Certificate: The server (the host agent 211) sends a Certificate message to the client (the web browser running on the host computer 103). The host agent 211 can read the certificate directly via the read-only mass storage interface 210 on the smart card 101. The card agent 213 is not involved in this message.

ClientKeyE.xchange: The ClientKeyExchange is a critical message for generating TLS session keys. It is sent by the client (the web browser) to the server (the host agent 211) and contains a pre-master-secret, PMS, that is encrypted using the public key, $K_{pb}$, of the smart card 101. From the perspective of the web browser, $K_{pb}$ is the public key of the web server, i.e., the host agent 211. The PMS can only be decrypted using the private key, $K_{pv}$ that resides on the smart card 101 in the secure data area 215. The host computer 103 and the smart card 101 use the following protocol to accomplish this.

In a preferred embodiment, the communication between the host agent 211 and the card agent 213, whether file based or over a direct channel, is encrypted using a symmetric key, $K_s$. The symmetric key K.sub.s may be initialized by the card agent or through the use of the public key infrastructure (PKI) as described herein below in Sections 2.6.2 and 2.6.3, respectively. The negotiation and diversification of this key is described herein below in Section 2.6.4.

In the following series of messages and elsewhere herein, the teen inside braces { } is encrypted using the key outside, e.g., $\{PMS\}K_{pb}$ means that the PMS is encrypted using the public key K.

1. The host agent 211 sends $\{PMS\}K_{pb}$ to the card agent 213.
2. The card agent 213 uses $K_p$, to extract PMS.
3. The PMS is then encrypted with $K_s$, i.e., $\{PMS\}K_s$, and sent back to the host agent 211
4. The host agent 211 uses $K_s$ to extract PMS and can now continue with the TLS handshake.

The handshake cannot complete without the presence of the smart card 101 to provide $K_{pv}$. As such, the host agent 211 cannot establish a secure connection with a remote server or a local browser if the smart card 101 is not present.

1.2. TLS Client Handshake

If a client does not trust a remote server, e.g. 109, in FIG. 1, if the remote service 113 provides a very sensitive service to the user 111, the user 111 may want to ensure that he is communicating with the service he is expecting rather than an imposter. In this case the user, via the host computer would perform a TLS Client Handshake with the remote server 109. In this scenario, the host agent 211 is the client. This scenario is used when validating a remote server having a given URL, e.g., www.myBank.com. Again, while the entire TLS handshake requires several messages, the only message of interest in the present discussion is the Certificate message that is received from the server 109. The host agent 211 and the card agent 213 perform the validation of the received Certificate as follows:

1. The host agent 211 sends these two items to the card agent 213: $\{Certificate\ Chain, URL\}K_s$. The certificate chain is a chain of public key certificates where the authenticity of the signer of each certificate is provided by the next certificate in the chain, until the last certificate is reached (called the root certificate) which everyone trusts.
2. The card agent 213 uses $K_s$ to decrypt the certificate chain and the URL received from the host agent 211.
3. The card agent 213 parses the x.509 certificate chain and extracts the public key of the remote server, $RK_{pb}$. The card agent 213 also extracts the subject common name from the X.509 certificate and compares the subject common name with the URL. The subject common name is the name of the entity to which the certificate is issued. In the context of SSL certificates it is the URL that users connect to. E.g., when connecting to www.amazon.com you should receive a certificate that has www.amazon.com as its common name. These should match if the certificate is from the URL.
4. The match result, a cryptographically secure random number and the remote server public key are sent back by the card agent 213 to the host agent 211; $\{RK_{pb}, RN, Result\}K_s$.

5. The host agent 211 decrypts these values using $K_s$ and proceeds with the TLS handshake with the remote server 113.

In this design, the remote server 109 validation happens completely on the smart card 101. The results are passed back to the host agent 211 in a secure way using a diversified symmetric key $K_s$. In an alternate embodiment the performance of certificate validation can be improved by not passing the completed certificate to the card-agent 213, but instead only sending the final signature value that is extracted from the certificate. The card-agent 213 verifies the signature and sends the result to host agent 211.

1.3. User PIN Authentication

The present invention may be deployed to use a Personal Identification Number PIN to authenticate a user with the smart card 101. Without a proper authentication, the smart card 101 will not make its service available during the current session. For PIN authentication, the host agent 211 performs the functions of a web server (thus allowing a user to interact with it using a web browser), and TLS handshake has been completed between the host agent 211 and the card agent 213. To complete the chain of trust between the user 111 and the card 101, the user 111 should be authenticated to the card 101. The host agent 211 and card agent 213 accomplish this as follows:

1. The host agent 211 sends a login page with a virtual PINpad to a client browser on the host computer 103. Thus, the PINpad is displayed on the screen of the host computer 103 through the client browser.
2. The user enters the PIN on the PINpad, e.g., by entering mouse clicks or, if permitted, by entering numbers on the keyboard.
3. The host agent 211 encrypts the user supplied PIN value with $K_s$ and sends to the card agent 213.
4. The card agent 213 extracts the PIN, compares it with the actual PIN stored in secure file system 215.
5. A match result is returned to host agent 211 encrypted using $K_s$. In case of a mismatch, the card agent 213 could also return the remaining attempts before the smart card 101 is locked.

The PIN authentication can be made even more secure by generating the randomized graphical keypad image on the smart card 101. The PIN authentication as described here, is another example of the flexibility of dividing functionality between the card agent 213 and the host agent 211.

2. Communications Protocols

As discussed herein above, the card agent 213 and the host agent 211 communicate via the communications files 217. In a first alternative embodiment, the web server is on the smart card 101. The host agent 211 acts as a proxy that forwards TLS messages between the smart card 101 and the browser client running on the host computer 103 or on a remote server 109. In a second alternative embodiment, the host agent 211 performs the functions of a web server. In that embodiment, the smart card 101 is a security server for the host agent 211. All secrets and related processing remain on the smart card 101 and consequently are not exposed in a manner in which the secret may be compromised. In both of these embodiments, the TCP/IP stack required for communication over the network 107 remain on the host computer 103.

From a communications perspective, these two embodiments represent different ends of the spectrum of possible divisions of responsibilities between the host agent 211 and the card agent 213. The requirements of communication protocols for these scenarios are different. Table 2 outlines the protocol requirements and analysis.

TABLE 2

Communications requirements

| | Web server on card | Web server on host, card is a security server. |
|---|---|---|
| Packets | TLS messages | Functional requests and responses. |
| Sync between Card and host? | No. (Most of time, yes. But not always.) | Yes |
| Duplex | Full-duplex | Half-duplex |
| Command/Response | No | Yes |
| Protocol complexity | Simple (length) | More Complex (command type, length, parameters, status, etc.) |
| Error checking | Probably not | Probably not |
| Retransmission | Probably not | Probably not |
| Encryption | No | Yes, with symmetric key |
| Card side API | Socket API | Functional API |

2.1. Web Server on the Smart Card

In an embodiment in which a web server is operated on the smart card 101, the web server and a web agent are on the smart card 101. The host agent 211 is a proxy that forwards TLS messages between the smart card 101 and either the browser client executing on the host computer 103, or a remote web server executing on server 109. On the host agent side, the communication layer, which is implemented as part of the host agent 211, provides a standard socket API to application programs, e.g., web server, web client. A full duplex communications protocol for communication between the host agent 211 and the card agent 213 is implemented on top of the Mass Storage file I/O. A Simple Transport Protocol (STP) that is described in co-pending patent application Ser. No. 10/848,738, filed on 19 May 2004, and entitled Secure Networking Using a Resource-constrained Device (the entire disclosure of which is incorporated herein by reference) may be implemented on top of the communication protocol. The STP is a full duplex transport protocol that enables socket operations on the smart card side. (It is a kind of remote socket approach.) The protocol stack is illustrated in Table 3:

TABLE 3

Protocol Stack for Web Server on the Smart Card embodiment

Simple Transport Protocol
Communication Protocol
Mass Storage Interface

A socket implementation with new transport and communication protocols replaces the traditional network protocols, e.g., TCP/IP. However, the application layers (TLS, web server, web client) remain unchanged. The major concern of this approach, however, is performance over the communications files.

2.2. Smart Card as a Security Server

In the alternative embodiment in which the smart card 101 acts as a security server for the host computer 103, the host agent 211 performs the functions of a web server. All secrets and processing of secrets are performed on the smart card 101 and thus are not exposed. The host agent 211 performs most of the other tasks related to providing web server functionality. Table 4 illustrates two alternative communications protocols for transmission between the host agent 211 and the card agent 213 when the latter acts as a security server.

TABLE 4

Alternative Communications Protocol for use when Smart Card is a Security Server

| | Traditional smart card APDU style | Layered style |
|---|---|---|
| Protocol style | Communication protocol has application syntax. For example, APDU has application specific command, such as CREATE, CHANGE CHV. | The communication protocol and application protocol are separate layers. The communication protocol sends data back and forth without examine the payload. The application protocol contains commands, parameters and data. |

| | Communication Protocol Option: | |
|---|---|---|
| Options | Half-duplex, command/Response | Full-duplex |
| Advantages | Simple to implement; Can use code from existing smart card implementations. | Simple to implement; Card is a slave. | Same communication protocol as web server on card; no wait - better performance; card is not a slave; it can initiate communication. |
| Disadvantages | Inflexible. A new application may require adding new commands. Less performance than full duplex. Card is a slave. | Less performance than the full-duplex | More complex to implement |

The full-duplex layered approach is described in greater detail herein below.

2.3. Communications Protocol Stacks

In one embodiment, the protocol stack on both the host computer 103 and the smart card 101 contains the layers illustrated in Table 5.

TABLE 5

Exemplary Communications Protocol Stack for Host and Card communication

Application Layer Protocol (ALP)
Communication over Mass Storage Protocol (CMP)
Link Layer Protocol From a programming perspective, the link layer protocols are different on the host side and the card side, although the actual physical and link layers are the same on both sides. The host side link layer is file I/O because a user mode program cannot access the USB Mass Storage interface directly. However, the card side Operating System OS has a full control to its underlying protocols and hardware. Therefore, the card side link layer can be the USB Mass storage interface 405b. Table 6 is a presentation of a comparison of the host side communications stack and the card side communications stack.

TABLE 6

Comparison of the host side communications stack and the card side communications stack.

| Host side stack | Card side stack |
|---|---|
| ALP | ALP |
| CMP | CMP |
| File I/O | Mass Storage Protocol (MSP) USB Protocol |

On the smart card 101, messages for communication between the smart card 101 and the host computer 103 should not need to go through the card side file system. Communication packets received via MSP may go directly to the CMP layer. Similarly, packets to be sent, are sent from the CMP layer to the MSP layer, then to the USE layer directly.

2.4. Communication over Mass Storage Protocol (CMP)

In one embodiment of the invention, a communications protocol for allowing the host agent 211 and the card agent 213 over the USB mass storage protocol is implemented as part of the card agent 213 and host agent 211. This communications protocol is referred to herein as CMP. CMP is a full duplex protocol. Either side can initiate communication at any time as long as the channel is open. CMP applies to both the "Web server on card" and "Card being a security server" embodiments described herein above, i.e., CMP may be the communication protocol regardless how functionality is divided between the host agent 211 and the card agent 213.

From the perspective of the host agent 211, the channels are two files, toHostFile and toCardFile. The toCardFile is the channel to send messages from the host 103 to the smart card 101. The toHostFile is the channel for the host to receive messages from the card. From the card perspective, the channels are two end-points of the Mass Storage interface. From the card perspective, the files may not exist in a non-volatile memory. The smart card 101 implements the USB mass storage interface to present these files.

To send a message to the card agent 213, the host agent 211 writes to, for example, F:\toCardFile, where F: is the drive letter assigned by the host computer 103 to the read-write mass storage partition 223 enumerated by the smart card device 101. Similarly, to get a message from the smart card 101, the host agent 211 reads from F:\toHostFile.

Symmetrically, to receive a message from the host computer 103, the card agent 213 reads from toCardFile, and to send a message to the host agent, the card writes to toHostFile. The host agent 211 and the card agent 213 synchronize between read/write cycles to operate a USB mass storage based 110 channel.

In one embodiment of the invention, the file based I/O channel uses the event mechanism of the host computer 103 to trigger a read operation by the host agent 211 in response to new data being made available by the card agent 213. In that embodiment, the smart card 101 produces an event interrupt to the host computer 103 in conjunction with writing to the toHostFile. Thus, this embodiment requires a mechanism whereby the smart card 101 can create interrupt events on the host computer 103.

In alternative embodiment, the host agent 211 polls the toHostFile for new data. Polling in general is a CPU intensive operation. However, in one embodiment of the invention, the host agent 211 polls the toHostFile only after writing a command to the toCardFile, i.e., the host agent 211 only polls the toHostFile when it expects data. As seen from the various use case scenarios described herein below, the interaction between the host agent 211 and the card agent 213 is a small portion of the overall message exchange with external entities, remote servers or local web browsers. Therefore, polling does not pose a drain on the host CPU 401.

Figure 5:
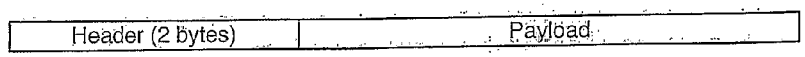
FIG. 5 is a schematic illustration of various data frames used in the protocol, the Communication over Mass Storage Protocol (CMP), used to communicate between the host agent and card agent.
Figure 5:
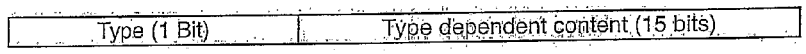
Figure 5:
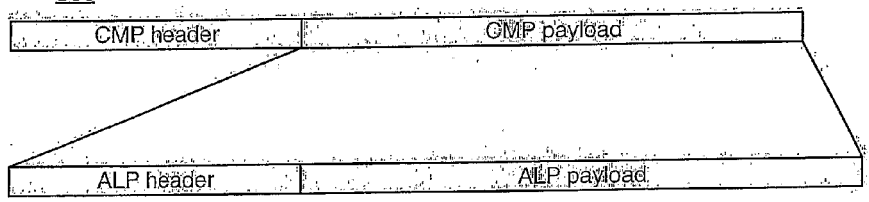
Figure 5:
Figure 5:
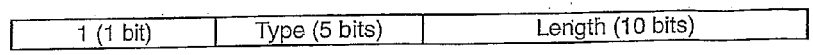

FIG. 5 is a schematic illustration of various data frames used in the CMP protocol.

The message format is similar to that of USB-EEM (Ethernet Emulation Model). A CMP frame 501 has a 2-bytes header and a payload. The header 503 contains a type bit and type dependent content (15 bits). For type=0, the payload is data, that is, it is an Application Layer (APL) frame 505. ALP is a communications protocol defined herein to provide communication between the host agent 211 and the card agent 213 over the file based I/O channel described herein. The CMP payload field then carries the ALP header and ALP payload. For an ALP frame, the CMP header has the format illustrated in element 507. It contains the type bit (0), and Encryption flag (1 bit), and compression flag (1 bit) and the length of the payload.

Encryption flag: 1—payload is encrypted; 0—payload is not encrypted. Compression flag: 1—payload is compressed; 0—payload is not compressed. The 13 bits after the type is the length of the data payload.

Type=1: the frame contains a protocol management command. The data payload may be null. One example is the Echo command, with which one end can check the status of the other.

2.5. Application Layer Protocol (ALP)

The application layer protocol is a full duplex protocol. Messages are in request/response format. Both sides can initiate communications, i.e., both the card agent 213 and the host agent 211 can send requests and expect responses. Each side can send requests when they need to. However, to synchronize the channel, each side responds to a previous request from the other side before sending its own request. However, for the sake of performance considerations, the actual implementation of ALP can be forced into half-duplex master-slave communication model where the card agent 213 simply executes the commands as requested by the host agent 211.

Figure 14:
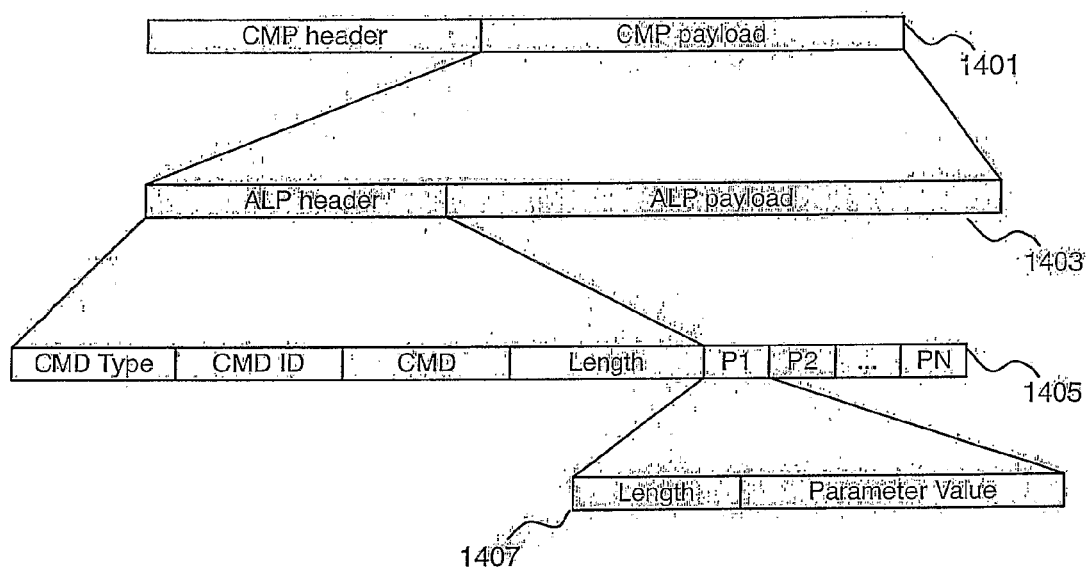
FIG. 14 is a schematic illustration of the structure of an Application Layer Protocol (ALP) frame carried in the payload field of a CMP frame.

The CMP encapsulates ALP frames, i.e., the payload of a CMP packet contains an ALP frame, which in turn consists of an ALP header and an ALP payload. FIG. 14 is a schematic illustration of the structure of an ALP frame 1403 carried in the payload field of a CMP frame 1401. The ALP frame 1403 consists of an ALP header and an ALP payload field. The ALP header is a 4-byte field containing four fields:

CMD type: 1 bit, 1 for request; 0 for response.
CMD ID: Command ID, 7 bits. This is mainly for correspondence between request and response. The Command ID increases by 1 for each command. It is re-used.
CMD: command, 1 byte. This value identifies the command and is similar to a function name in an RPC.
Length, 2 bytes, the total length of parameter data for this command.

The ALP payload consists of a series of parameters 1405. Each parameter $P_i$ 1407 consists of both length in bytes and actual parameter value.

2.6. Communication Security

A symmetric key $K_s$, secures the communication channel between the host agent 211 and the card agent 213. This key can be diversified on a regular basis to prevent brute force attacks. The host agent 211 and the card agent 213 use $K_s$ to encrypt and decrypt the payload of a CMP frame. The initial value of Ks can be obtained through two different mechanisms depending on whether the host agent 211 is launched from the host 103 or from the mass storage portion of the card 101. In the case of the former, the initialization may be by PKI (section 0) and in the latter by way of a shared secret (section 0). In both cases the diversification login can be the same.

2.6.1 Management Frame

The communication layer uses management frames 509 to perform the three-way handshaking for initial key exchange, or subsequent key diversification. As described above, the first bit is the frame type. When it is 1, the frame is a management frame. The next 5 bits indicate the type of the management frame. Table 7 describes the type definition for management frames for the symmetric key initialization or diversification.

TABLE 7

Type definition for management frames for the symmetric key initialization or diversification.

| Type | Length | Meaning |
| --- | --- | --- |
| 0x0 | 0 | Reserved |
| 0x1 | Message length | Initial: Send key Ks from host to card. |
| 0x2 | Message length | Initial: Send from card to host to verify Ks. |
| 0x3 | 1 for ACK, 0 for NAK | Initial: ACK or NAK, send from host to card. |
| 0x4 | Message length | Reset: Send new key Ks from host to card. |
| 0x5 | Message length | Reset: Send from card to host to verify new Ks. |
| 0x6 | 1 for ACK, 0 for NAK | Reset: ACK or NAK, send from the host to card. |

2.6.2 Initialization of Shared Secret

The initialization of the symmetric key, $K_s$, through a shared secret between the card and the host agent, is the preferred method of securing the host/card communication. The shared secret Ks can be achieved by updating the host agent binary in the mass storage portion 221 of the smart card 101 prior to loading the host agent 211 on the host computer 103. On each card reset, the smart card processor 201 generates a random key of desired length and writes to the non-volatile memory (NVM) memory allocated for this purpose inside the host agent binary. This is possible since the executable for host agent 211 actually resides on the smart card 101. The host agent nevertheless runs on the host computer 103. However, because it resides in the NVM 205 of the smart card 101 the smart card processor 201 may write the shared secret Ks into the host agent binary. This initial random key becomes the initial value of $K_s$. To further secure the shared secret key, the card and host agents may employ various obfuscation techniques. For example, the shared secret is not written in a contiguous memory space of the host-agent but is spread over a predetermined set of locations using a predetermined algorithm. More specifically, the shared secret may be partitioned into two parts and writing each part in non-contiguous memory space at predetermined locations using a predetermined algorithm.

2.6.3 Initialization by PKI

The following discussion assumes that the host agent 211 has been loaded onto and runs from the host computer 103 without having a preset shared secret. The initialization of Ks is done using public key cryptography. In this scenario the host agent 213 can be sure that it is communicating with a legitimate card agent 211. However, the converse is not true. It is not possible for the card agent 213 to confirm that it has exchanged Ks with the legitimate host agent 211.

The host agent 211 generates a session key Ks of desired number of bytes for symmetric encryption. The host agent 211 shares Ks with the card agent through a three-way handshaking as is illustrated in Table 8.

TABLE 8

Three-way handshake to exchange Ks using PKI

| Host agent | Channel | Card agent |
|---|---|---|
| Generate Ks and a RND<br>Encrypt Ks and RND with the public key, Kpb, of the card:<br>{Ks, RND}Kpb<br>Send to card. | {Ks, RND}Kpb → | |
| | {RND}Ks ← | Decrypt with the card's private key:<br>{Ks, RND} = {{Ks, RND}Kpb}Kpv<br>Encrypt RND using Ks {RND}Ks; send to host to verify. |
| Decrypt RND using Ks<br>RND' = {{RND}Ks}Ks<br>If RND == RND, send ACK<br>Else, send NAK. | ACK (or NAK) → | If receive ACK, the card and the host can use Ks. |

The symmetric encryption using Ks is performed by the communication layer, which is, for example, implemented as library calls on the host agent 211 and card agent 213, of the host agent 211 and card agent 213. Implementing encryption of Ks at the communication layer ensures the security of the application layer protocol data packets. The host agent 211 regenerates Ks periodically and exchanges the new Ks with the card agent 213. The host agent 211 generates a new key Ks according to several conditions, for example, when the host agent 211 has been idle for a period of time or before host agent 211 starts a new request to the smart card 101.

2.6.4 Key Diversification

Figure 6:
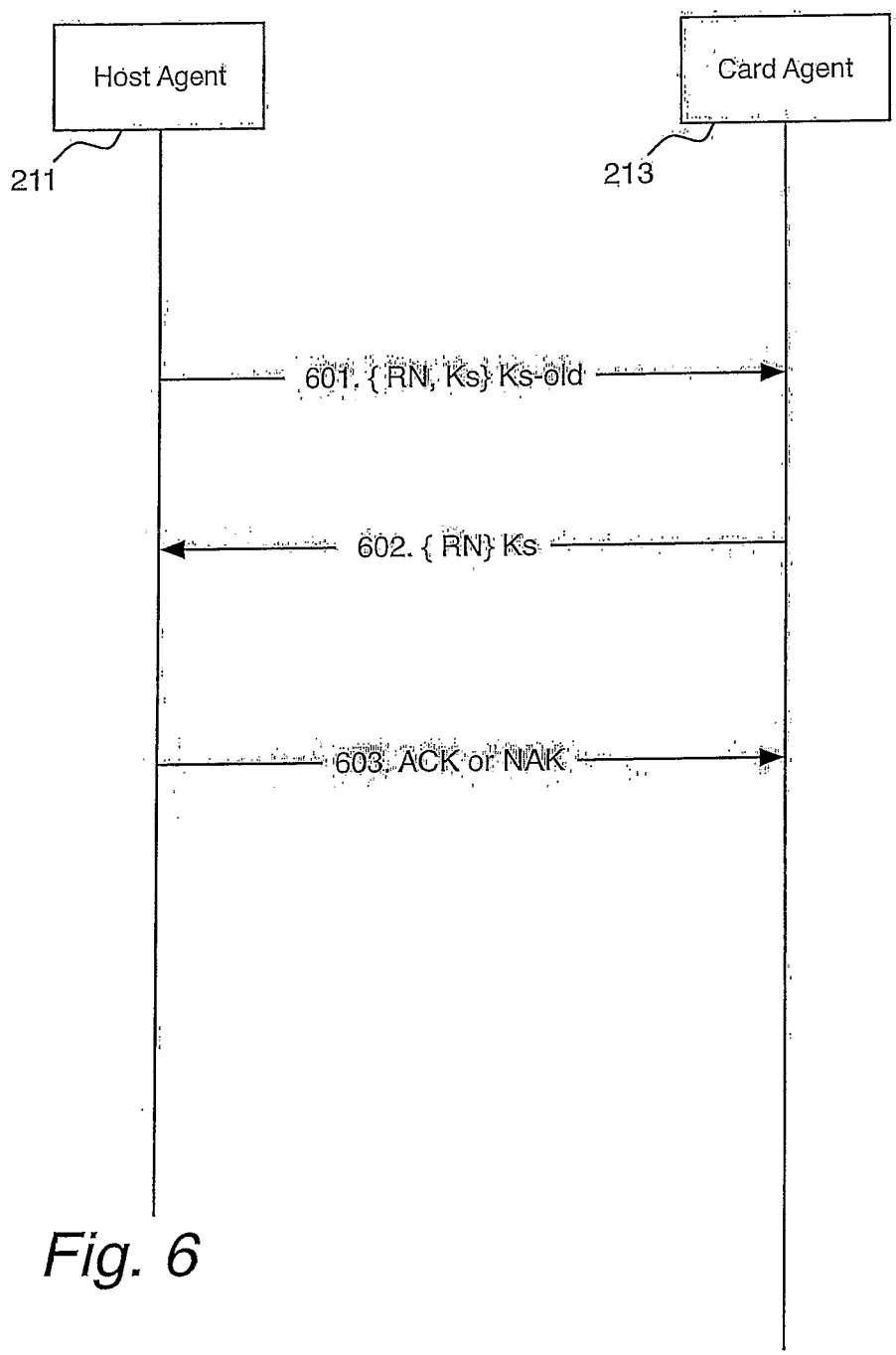
FIG. 6 is a timing sequence diagram illustrating the method by which key diversification is performed by the host agent and the card agent.

Regardless of the method of setting the initial value of symmetric key $K_s$, the $K_s$ key may have to be diversified while the smart card 101 is in use. Key diversification is a process whereby a unique key is generated from a common master key. This prevents a symmetric key from being stale and open to brute force attack. The negotiation of the new key requires knowledge of the current symmetric key. This way a malicious third party cannot break the secure connection between host and card agents by introducing an arbitrary symmetric key. FIG. 6 is a timing sequence diagram illustrating the method by which key diversification is performed by the host agent 211 and the card agent 213:

Step 601. The host agent 211 generates a new random number, RN, and a new symmetric key Ks. These values are encrypted using the current (now old) value of the symmetric key, $K_{s\text{-}old}$, and sent to the card agent 213.

Step 602. The card agent 213 decrypts the two values. It then encrypts RN with the new value of symmetric key and sends it back to the host agent 211.

Step 603. The host agent 211 decrypts RN. The host agent 211 then sends back a response to the smart card 101. Both agents now have a new value of the key.

Compression

Using the USB Mass Storage interface and the file I/O interface of the host computer 103 may make the communication the bottleneck of the whole process. Not only can compression alleviate this problem, but also make the communication channel more secure. The host agent 211 and the card agent 213 can use a predefined compression algorithm to compress the data before sending and decompress after receiving. The compression should be used when the communication performance gain overrides the overhead of compression and de-compression.

If both compression and encryption are used, data must be compressed and then encrypted. Smaller compressed data gives a potential eavesdropper less data to work with, which provides greater security. Furthermore, encrypted data usually does not compress well.

Use Case Scenarios

A smart card 101 as described herein may be used in many useful Internet transactions. For exemplary purposes, in the use cases described herein below, the host agent 211 acts as a web server, web client, and also implements part of the TLS protocol. Conversely, the card agent 213 acts as a security device. The card agent 213 stores confidential data and implements the most critical pieces of the TLS protocol.

2.7. Use Case: TLS Server Handshake

Figure 7:
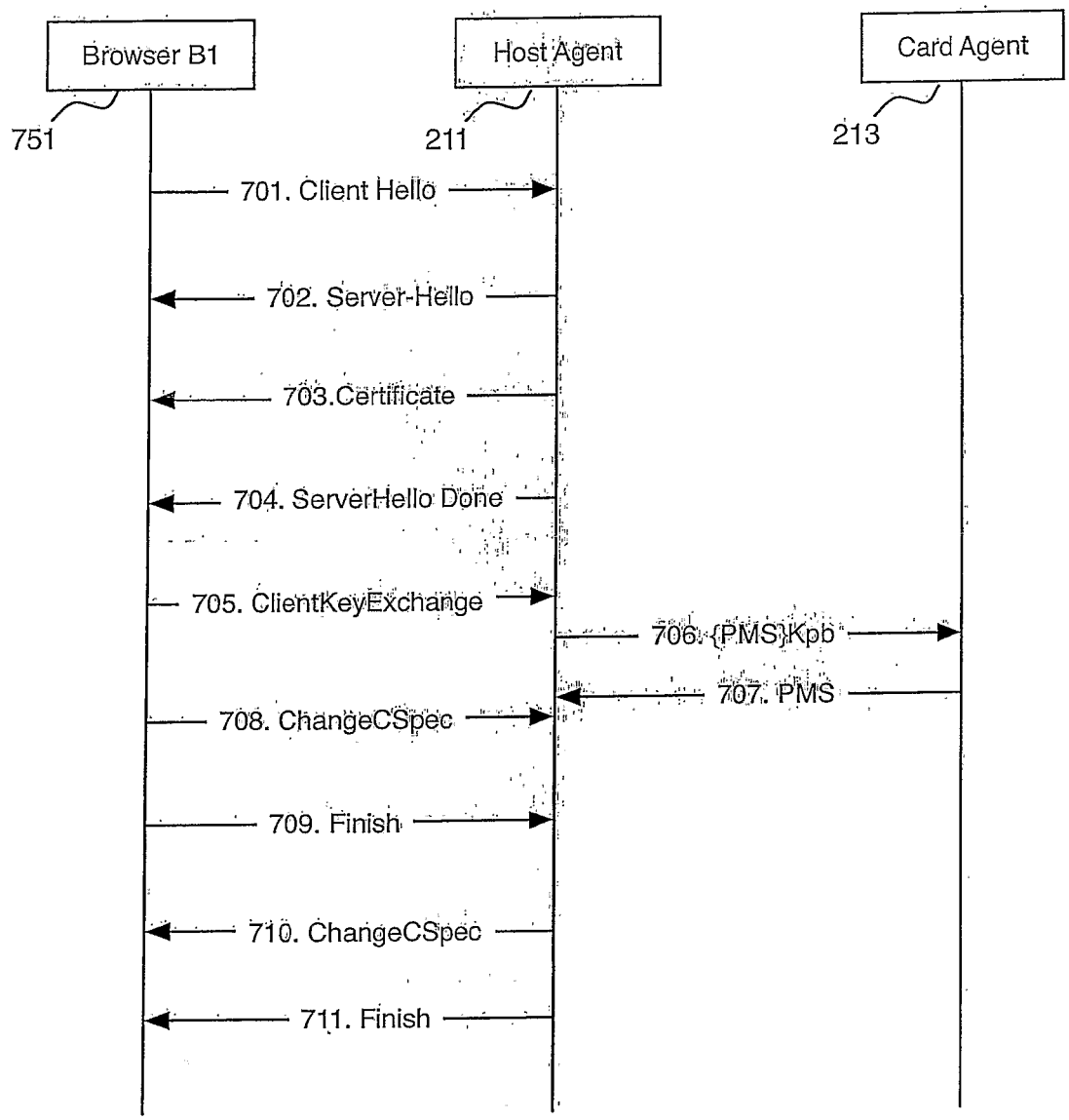
FIG. 7 is a timing sequence diagram illustrating the messages transmitted between a browser, the host agent and the card agent during a TLS server handshake establishing a TLS communication between the browser and the host agent.

FIG. 7 is a timing sequence diagram illustrating the messages transmitted between a browser 751, the host agent 211 and the card agent 213 during a TLS server handshake establishing a TLS communication between the browser 751 and the host agent 211.

Step 701. The browser B1 751 sends a TLS ClientHello message to host agent 211.

Step 702. The host agent 211 responds with a ServerHello message.

Step 703. The host agent 211 reads the card certificate from the USB mass storage partition 221 and sends it to the browser B1 751. The card certificate contains the public key $K_{pb}$ of the card.

Step 704. The host agent 211 sends ServerHelloDone message.

Step 705. The browser B1 751 sends back a ClientKeyExchange message that has a pre-master-secret, PMS, encrypted with the public key of the smart card 101, $K_{pb}$.

Step 706. The host agent 211 forwards this encrypted PMS to the card agent 213 for decryption.

Step 707. The card agent 213 extracts the value of PMS using $K_{pv}$, the private key of the smart card 101. It then returns the PMS value back to the host agent 213. Note: all communication between the card and host agent is encrypted with a symmetric key Ks, e.g., as described in Section 2.6. The host agent 211 can now use the PMS to generate the TLS session keys.

Step 708. The host agent 211 reads the ChangeCipherSpec message from the browser B1 751.

Step 709. The host agent 211 reads and parses the Finish message from the browser B1 751.

Step 710. The host agent 211 sends the ChangeCipherSpec message to browser B1 751.

Step 711. The host agent 211 sends the Finish message to the browser B1 751. This message uses session key created after step 707.

2.8. Use Case: TLS Client Handshake

Figure 8:
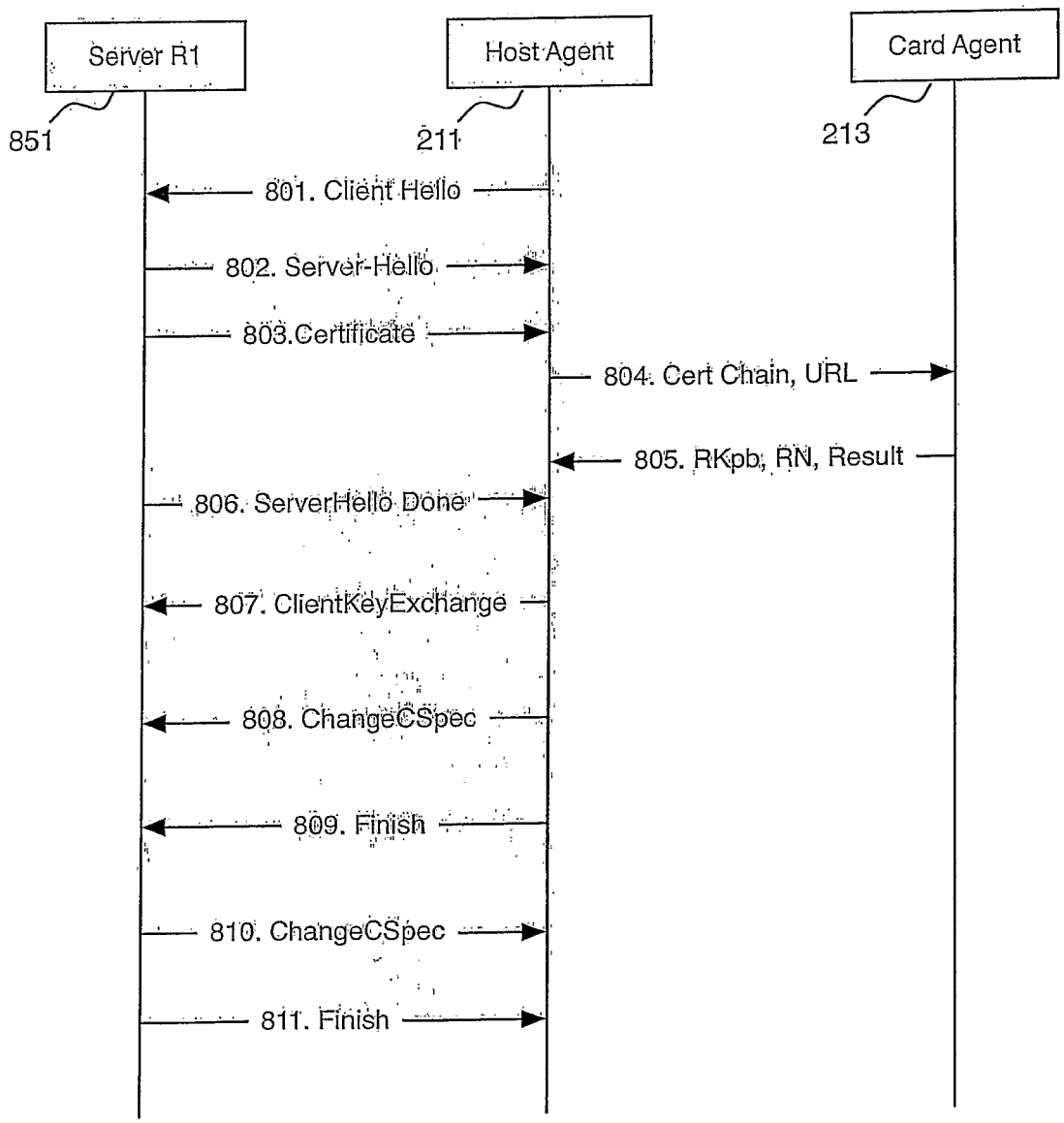
FIG. 8 is a timing sequence diagram illustrating the messages transmitted between a remote server, the host agent and the card agent during a TLS client handshake establishing a TLS communication between the remote server and the host agent.

FIG. 8 is a timing sequence diagram illustrating the messages transmitted between a remote server 851, the host agent 211 and the card agent 213 during a TLS client handshake establishing a TLS communication between the remote server 851 and the host agent 211. In this use case, the host agent 211 acts as a TLS client using the services of the card agent to validate the authenticity of the remote server 851.

Step 801. The host agent 211 sends ClientHello message to the remote server R1 851.

Step 802. The remote server R1 851 responds to the host agent 211 with ServerHello message.

Step 803. The remote server R1 851 then sends Certificate message to the host agent 211.

Step 804. The host agent 211 relies on the card agent 213 to parse the certificate message and verify the validity of the remote server 851. The certificate chain from the remote server R1 851 and the URL on which the remote server R1 851 reached is passed to card agent 213.

Step 805. The card agent 213 parses the chain of certificates and extracts the common name, CN of the subject. This name should match URL. It also extracts the public key of the remote server 851. This public key, RKpb, a cryptographically secure random number RN, and the result of certificate verification are sent back to host agent.

Step 806. The host agent 211 reads the ServerHelloDone message.

Step 807. The host agent 211 uses RN to create a pre-master-secret, PMS. The PMS is encrypted using RKpb and sent to the remote server R1 851 as part of ClientKeyExchange message. The host also uses PMS to calculate a new set of TLS session keys.

Step 808. The host agent 211 sends ChangeCipherSpec message to the remote server R1 851.

Step 809. The host agent 211 uses the session keys calculated in step 807 to create a Finish message, which is sent to the remote server R1 851.

Step 810. The host reads ChangeCipherSpec message from the remote server R1 851.

Step 811. The host reads, and parses the Finish message from the remote server R1 851.

2.9. Use Case: PIN Authentication

Figure 9:
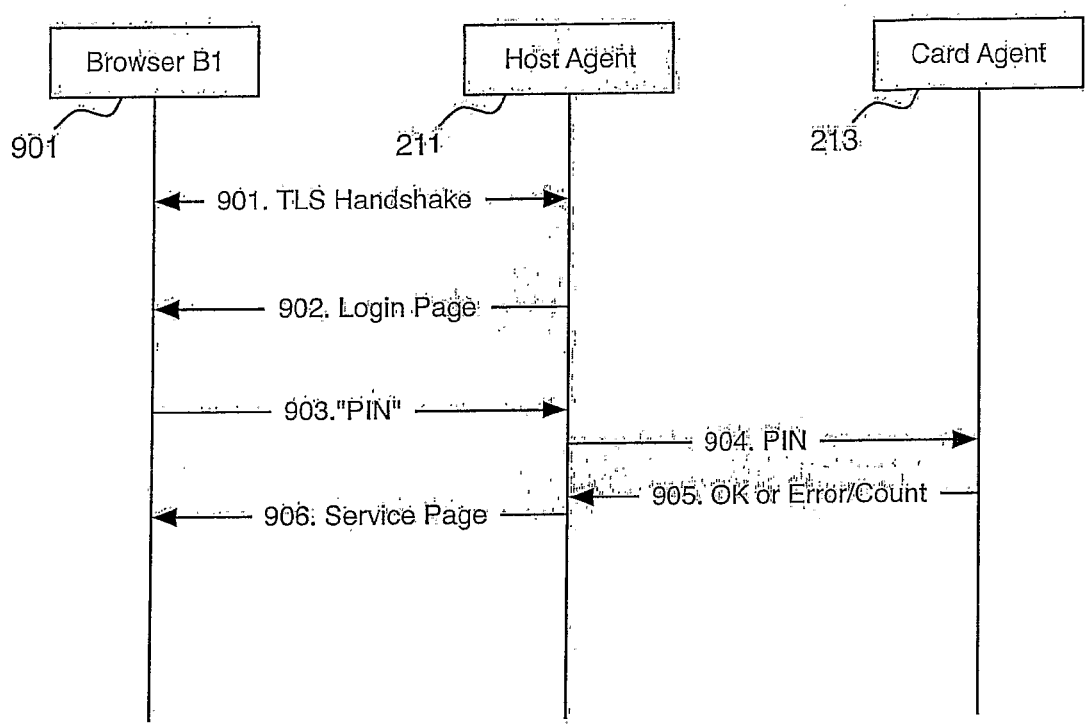
FIG. 9 is a timing sequence diagram illustrating the message flow between the host agent and the card agent employed to authenticate a user using a PIN.

In an alternative embodiment of the invention, the host agent and card agent are used to authenticate a user using a browser B1 against a PIN stored on the smart card 101. FIG. 9 is a timing sequence diagram illustrating the message flow between the host agent 211 and the card agent 213 employed to authenticate a user using a PIN. The PIN is stored in the secure data 215.

Step 901. The user 111 opens a browser B1 901 on the host computer 103, and establishes a TLS connection with the host agent 211. The details of this process are given in section 2.7.

Step 902. The host agent 211 sends back a login page with the graphical PINpad.

Step 903. The user 111 enters a PINT on the graphical PINpad, which is sent back to host agent 211. This "PIN" is actually the graphical coordinate representation of the real PIN. A graphical PINpad and the use thereof is described in co-pending patent application Ser. No. 11/076,682, Michael Montogomery and Asad Ali, filed on 10 Mar. 2005 and entitled "System and method of secure login on insecure systems", the entire disclosure of which is incorporated herein by reference.

Step 904. The host agent 211 extracts the actual PIN from this graphical representation and sends it to card agent 213.

Step 905. The card agent 213 compares this PIN value with the value stored on the smart card 101. The response is either OK, or an error. In case it is the latter, a count value is also sent back to indicate the number of remaining retry attempts before the smart card 101 locks up.

Step 906. On receiving the OK response, the host agent 211 sends a service page to browser B1 901. The user can now instruct smart card 101 to perform additional services.

2.10. Use Case: Account Setup

Figure 10:
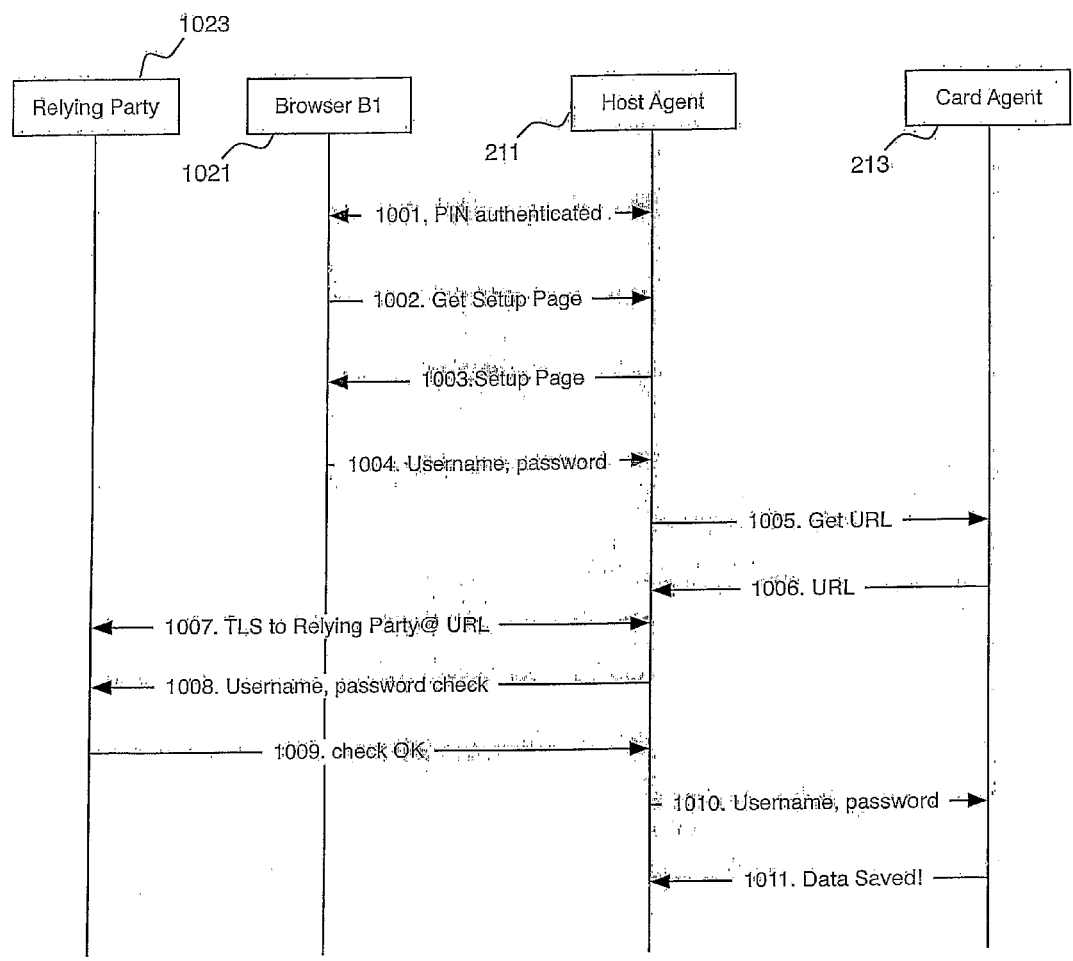
FIG. 10 is a message sequence diagram illustrating the message flow for setting up a new user account on the smart card.

This section describes the scenario of setting up a new user account for a remote service on the smart card 101. The account setup use case starts after the user 111 has been authenticated to the smart card 101 as described in section 2.9 in conjunction with FIG. 9. FIG. 10 is a message sequence diagram illustrating the message flow for setting up a new user account on the smart card 101.

Step 1001. The user 111 starts a browser B1 1021 on the host computer 103, which connects to host agent 211 and after TLS handshake authenticates user via PIN. See section 2.9 for details.

Step 1002. The user 111 clicks on a setup link to setup account data for a Relying Party 1023, e.g. myBank.com. The link and the URL for the relying party are provided by the smart card through an interaction provided by the host agent.

Step 1003. The host agent 211 sends back an account setup page for myBank.com to the browser B1 1021.

Step 1004. The user 111 enters username and password.

Step 1005. The host agent 211 asks the card for the URL for Relying Party 1023. In step 1002 only the setup page is requested, not the URL. The setup page has the HTML code to allow the user to enter a username and password. Once the host agent receives this information, the host agent 211 sends it to the relying party 1023 for validation. The URL for this relying party 1023 is obtained in step 1005.

Step 1006. The card agent 213 responds with the URL.

Step 1007. The host agent 211 uses this URL to connect to the Relying Party server 1023 over TLS. See section 2.8.

Step 1008. The host agent now sends the username and password to the Relying Party 1023 for verification. This step is taken to ensure that incorrect user data is not stored on the card.

Step 1009. The relying party 1023 replies with a confirmation.

Step 1010. The host agent 211 now sends the username and password to the card agent 213.

Step 1011. The card agent 213 stores this data on smart card 101 and responds with a confirmation message.

2.11. Phase-1 Login

According to one embodiment of the invention, login with a relying party 1023 may be performed using one or both phases of a two-phase login procedure. Phase 1 and phase 2 are two complimentary methods of authenticating a user to a relying party 1023. Phase 1 is a quick way in which the username/password are sent to the relying party 1023 through a browser redirect. The relying party 1023 can now allow the user to access some non-critical services, e.g. browse and select items, but may not allow access to more critical tasks, e.g. bid on items. Access to such critical services is only granted when phase 2, a more rigorous authentication has been completed. In Phase 2, the host agent 213 receives a ticket from a verifying party and sends it to the relying party 1023 on the user's behalf. This further authenticates the user, and the relying party 1023 can now open up access to critical services.

This section describes the sequence of message exchange to support the first phase of login to a relying party, e.g. myBank.com.

Figure 11:
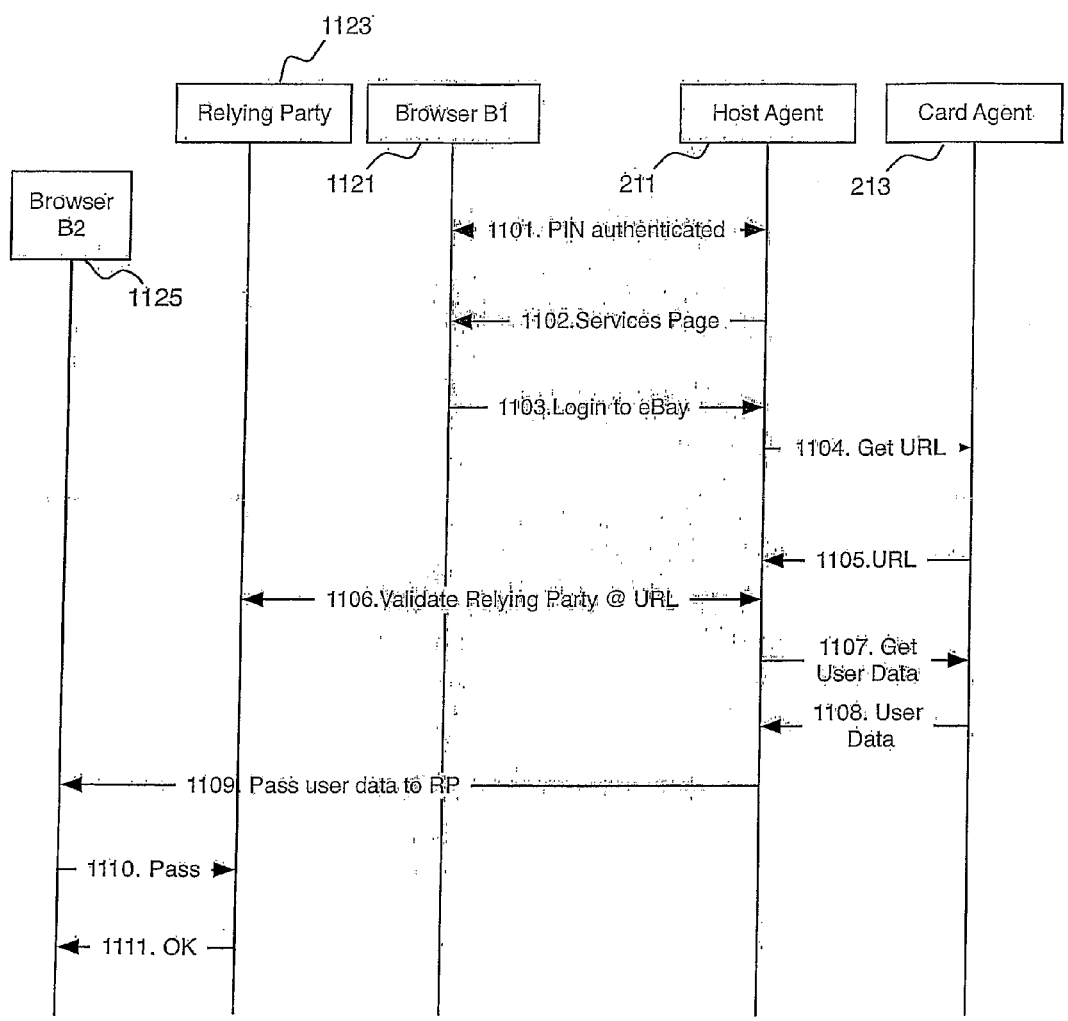
FIG. 11 is a message sequence diagram illustrating the message flow for performing Phase-1 login using the host agent and card agent.

FIG. 11 is a message sequence diagram illustrating the message flow for performing Phase-1 login using the host agent 211 and card agent 213.

Step 1101. The user opens a browser B1 1121 and connects to the host agent 211. After TLS handshake, the user PIN is validated. See section 2.9 for details.

Step 1102. The host agent 211 sends back a services page with a list of all available relying parties.

Step 1103. The user 111 clicks on one such relying party 1123 and asks to be logged into that server.

Step 1104. The host agent 211 asks the card agent 213 for a URL to that server.

Step 1105. The card agent 213 responds with the URL.

Step 1106. The host agent 211 confirms the validity of this URL. See section 2.8 for details.

Step 1107. Once the relying party server is validated, the host agent 211 asks the card agent 213 for user data. This user data may include the username and password as well as the form template to be submitted to the relying party 1123.

Step 1108. The card agent 213 responds with the relevant user data and a login script that may be used to login to the relying party.

Step 1109. The host agent 211 passes this login script and user data to a new browser instance B2 1125.

Step 1110. The browser B2 1125 automatically submits the user data to the relying party server @ URL.

Step 1111. The login data is validated and user is logged in the relying party server 1123 from the browser B2 1125.

2.12. Phase-2 Login

Figure 12:
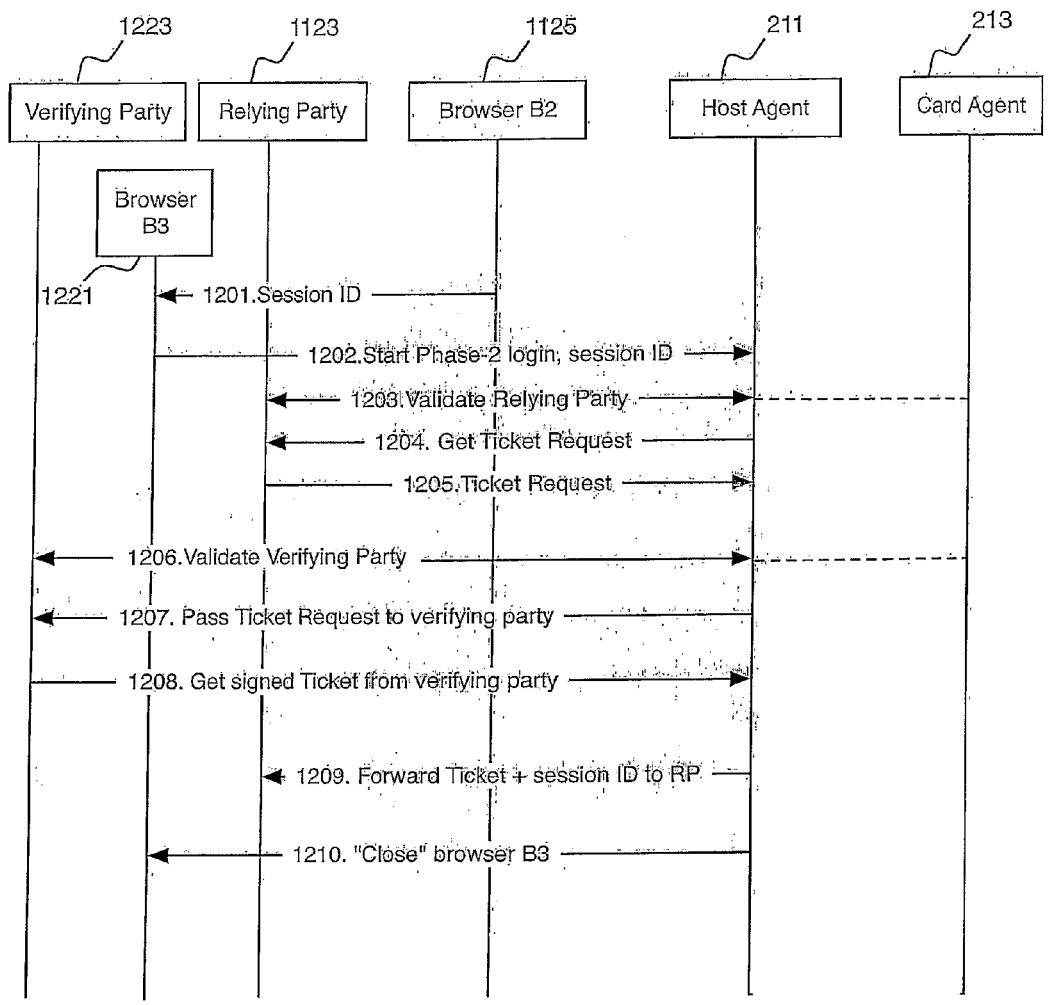
FIG. 12 is a message sequence diagram illustrating the message flow for the Phase-2 login using a verifying party and the host agent and card agent.

While the Phase-1 login provides a way for a user to provide a login credential to a relying party 1123, in some cases the relying party may wish to obtain an even stronger verification of the authenticity of the user 111. In that case, the present invention provides support for a second phase of authentication to a relying party 1123 wherein the authenticity of a user 111 is verified by a third independent party, the verifying party 1223. At this point the user 111 has already been logged into the relying party server 1123 through the browser B2 1125. The details of this Phase-1 login are explained in section 2.11. FIG. 12 is a message sequence diagram illustrating the message flow for the Phase-2 login using a verifying party 1223 and the host agent 211 and card agent 213.

Step 1201. The user 111 clicks on a link in the browser B2 1125 to start the Phase-2 authentication. A session ID is passed to identify the current session with the relying party 1123. A new browser B3 1221 is opened. Note: Another option can be to start the phase-2 authentication immediately after phase-1. That scenario can also be handled easily.

Step 1202. The browser B3 1221 sends the phase-2 request to the host agent 211, along with session ID.

Step 1203. The host agent 211, with the help of the card agent 213 validates the relying party 1123.

Step 1204. The host agent 211 sends a message to get a Ticket Request from the relying party 1123.

Step 1205. The relying party 1123 sends a Ticket Request to the host agent 211.

Step 1206. The host agent 211, with the help of card agent 213 validates the verifying party 1223.

Step 1207. The host agent 211 passes the Ticket Request to the verifying party 1223.

Step 1208. The verifying party 1223 signs a new Ticket and sends it back to host agent 211.

Step 1209. The host agent 211 forwards the Ticket to the relying party 1123.

Step 1210. The response to request in step 1202 is sent. The formulation of the response is part of step 1202. Step 1210 actually accomplishes two things: 1. Change the message/UI on browser B3 1221 to indicate that phase 2 is complete, 2. Close the browser B3 1221. The close action may have to be taken by the user. E.g., B3 will provide a link that says, "Click here to close this window". The browser B3 1221 can now be closed.

2.13. Mid-Stream Login

Figure 13:
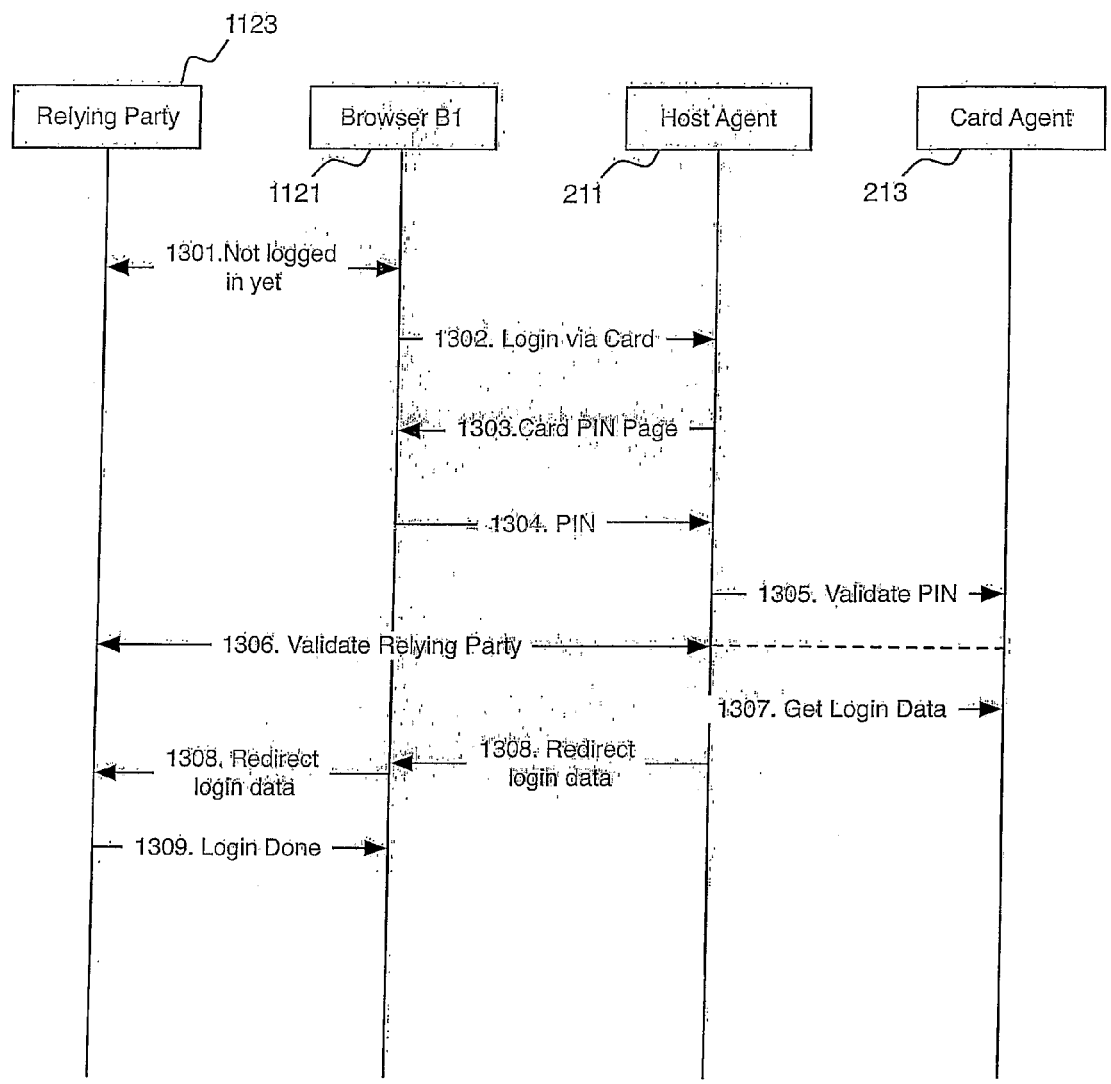
FIG. 13 is a message sequence diagram illustrating the message flow for mid-stream login using the smart card.

The present invention also supports a scenario in which a user may login into a relying party server using the smart card through an existing browser session when the user is connected to a relying party server through browser B1, but has not logged in yet. This is referred to as mid-stream login. FIG. 13 is a message sequence diagram illustrating the message flow for mid-stream login using the smart card 101.

Step 1301. The user 111 connects to the relying party server 1123 through the browser B1 1121, but has not logged in yet.

Step 1302. The user interface of the page displayed in the browser B1 1121 shows a link to login through the smart card 101. This can be done through a cookie placed by the relying party 1123. The user 111 clicks on this link to start the login process.

Step 1303. The host agent 211 receives the login request but the user 111 has to be authenticated through his PIN before the card will disclose his confidential login data. The host agent 211 sends back the smart card 101 login page with PINpad.

Step 1304. The user enters the PIN and the PIN is sent to host agent 211.

Step 1305. The host agent 211 sends the PIN to the card agent 213 for validation.

Step 1306. Once the card agent 213 confirms the PIN, the host agent 211 connects to the relying party 1123 and validates that the relying party 1123 is indeed the expected server. As explained in section 2.8 the certificate parsing is done by the card agent 213—hence the dotted line indicating message flow to the card agent 213.

Step 1307. Upon successful validation of the relying party 1123, the host agent 211 asks the card agent 213 for user login data for the user 111.

Step 1308. The login data along with a corresponding login script, is passed to the browser B1 1121, and then automatically redirected to the relying party 1123.

Step 1309. The relying party responds by allowing the user 111 access to his account. The user is logged in.

CONCLUSION

From the foregoing it will be apparent that the smart card having stored thereon a host agent and a card agent that cooperate to provide secure communication between a host computer and a smart card while maintaining the security of sensitive information stored on the smart card provides an efficient and secure approach to using the power of smart cards in providing secure network services without taxing the solution with specialized hardware or middleware. The solution may be deployed on a host computer without any special privileges; e.g., a user having only user privileges on the computer may nevertheless take advantage of the services provided by the smart card.

Although specific embodiments of the invention have been described and illustrated, the invention is not to be limited to the specific forms or arrangements of parts so described and illustrated. The invention is limited only by the claims.

We claim:

1. A secure portable electronic device for securing connections to remote servers thereby providing security to web services when the portable electronic device is used in conjunction with a host computer having a central processing unit of a first type, the secure portable electronic device having a central processing unit of a second type, wherein a secure service is provided by executing an application in a flexible distributed fashion among the host computer and the secure portable electronic device, comprising:
- a read-only memory partition, a read/write memory partition, and a secure memory partition;
- a communications interface for transmitting and receiving data between the host computer and the secure portable electronic device using a communications protocol over the communications interface;
- instructions stored in the read-only partition, wherein the instructions comprise:
  - a host agent containing instructions executable by a central processing unit of the first type and configured to launch on the host computer;
- private information stored in the secure memory partition;
- instructions stored in the secure memory partition, comprising:
  - a card agent containing instructions executable by central processing units of the second type, the instructions including:
    - a card agent communications module for communicating with the host agent; and
    - a security module for accessing private information stored in the secure memory partition; and
- a card-agent-to-host-agent association mechanism stored in memory of the secure portable device and that operates to uniquely associate the host agent stored on the secure portable device with the card agent stored in the secure memory partition of the secure portable device in a manner to ensure that the card-agent-to-host-agent association mechanism is configured to load with the host agent thereby identifying the host agent instance, when executing on the host computer, as the host agent instance uploaded from the secure portable device upon launching of the host agent instance uploaded from the secure portable device when the secure portable device is connected to the host computer;
- the host agent comprising instructions including:
  - a host agent communications module for communicating with the card agent;
  - a web server for connecting to a web browser operating on the host device thereby allowing a user to interact with the host agent and a web client for initiating connections to a remote server; and
  - at least one function requiring use of private information stored in the secure memory partition of the portable device and configured to transmit a request to the card agent to perform a corresponding function requiring the use of private information stored on the portable device.

2. The secure portable electronic device of claim 1, wherein the web server is configured to receive and respond to requests from the web browser operating on the host computer;
and wherein the host agent further comprises instructions including a web agent configured to initiate and communicate with the remote server, and configured to perform security services.

3. The secure portable electronic device of claim 1 wherein the security module of the card agent accesses the private information by the at least one function requiring use of private information and transmits a result to the host agent wherein the result does not reveal the private information.

4. The secure portable electronic device of claim 1 wherein the at least one function is selected from the set PIN Authentication, Account Setup, Phase-1 Login, Phase-2 Login, Mid-Stream Login.

5. The secure portable electronic device of claim 1 comprises an integrated circuit affixed to a card.

6. The secure portable electronic device of claim 1 the instructions stored in the read-only partition further comprising:
- a trigger file configured to automatically launch upon connection of the secure portable electronic device to a host computer, the trigger file having an instruction to cause the loading of the host agent by the host computer and execution of the host agent by the host computer.

7. The secure portable electronic device of claim 5 wherein the host computer has a standard hardware interface, standard host drivers, and standard software stored on the host computer and the secure portable device further comprises a hardware interface for connecting the secure portable device to the host computer using the standard hardware interface, the standard host drivers, and standard software of the host computer.

8. The secure portable electronic device of claim 1 further comprising a standard protocol and wherein the card agent and host agent communicate using a secure card-agent-to-host-agent communications protocol implemented in data frames of the standard protocol.

9. The secure portable electronic device of claim 8 wherein the standard protocol is the USB mass storage protocol.

10. The secure portable electronic device of claim 8 wherein the standard protocol is selected from the set including the USB mass storage protocol, USB human interface device protocol, and USB Chip/Smart Card Interface Device protocol (CCID).

11. The secure portable electronic device of claim 8 wherein the card agent further comprises a card-agent secure communications module configured to perform secure communications with a host-agent secure communications module of the host agent over the card-agent-to-host-agent communications protocol.

12. The secure portable electronic device of claim 1 wherein the central processing unit of the second type loads the card-agent into the RAM of the secure portable electronic device and executes instructions for the card-agent from the RAM and wherein the card-agent comprises instructions to cause initialization of the host-agent.

13. The secure portable electronic device of claim 12 wherein the card-agent-to-host-agent association mechanism is an initial shared secret embedded into the host agent by the card agent and the instructions to cause initialization of the host-agent comprises instructions to cause the secure electronic device to write the initial shared secret into a specific location of the host-agent thereby enabling the host-agent and card-agent to both hold the shared secret when the host-agent is executed by the host-computer.

14. The shared secret of claim 13 wherein the secret is not written in a contiguous memory space of the host-agent but is spread over a predetermined set of locations using a predetermined algorithm.

15. The secure portable electronic device of claim 1 wherein:
- the host agent further comprises:
  - instructions of a first portion of a user application requiring application of at least one security function; and
- the card agent further comprises:
  - instructions of a second portion of the user application requiring application of at least one security function.

16. The secure portable electronic device of claim 15 wherein the first portion comprises instructions to provide the functionality of a secure web server and web agent and the second portion contains instructions to provide a security function.

17. The secure portable electronic device of claim 16 wherein the first portion comprises instructions to provide the functionality of a thin proxy and the second portion provide functionality of a secure web server.

18. The secure portable electronic device of claim 1 wherein:
the host agent further comprises:
instructions to transmit a request to the card-agent to perform at least one security function; and
the card agent further comprises:
instructions to receive the request from the host-agent to perform at least one security function, and to perform the at least one security function.

19. The secure portable electronic device of claim 1 wherein the secure portable device further comprising:
a security mechanism to prevent data in the secure memory partition from external access.

20. The secure portable electronic device of claim 19 wherein:
the security mechanism allows solely the card-agent to access the private information stored on the portable device.

21. The secure portable electronic device of claim 1 wherein the host-agent and card-agent comprise instructions to provide communication between the host computer and the secure portable device.

22. The secure portable electronic device of claim 1 wherein the host agent comprises instructions that are executable on the host computer and provide services accessible through a standard web browser thereby providing a web interface to the secure portable device.

23. A secure portable electronic device comprising:
a connector for connecting the secure portable electronic device to a host computer having a host-computer central processing unit;
a card central processing unit;
a read-only memory partition having a host-agent comprising instructions executable by the host-computer central processing unit wherein the host-agent is configured to launch on the host-computer;
a secure read/write memory partition having a card-agent comprising instructions to execute on the card central processing unit;
a card-agent-to-host-agent association mechanism stored in memory of the secure portable device and that operates to uniquely associate the host agent stored on the secure portable device with the card agent stored in the secure memory partition of the secure portable device in a manner to ensure that the card-agent-to-host-agent association mechanism is configured to load with the host agent thereby identifying the host agent instance, when executing on the host computer, as the host agent instance uploaded from the secure portable device upon launching of the host agent instance uploaded from the secure portable device when the secure portable device is connected to the host computer; and
a trigger program stored in memory of the secure portable device;
the host-agent comprising a communications module configured to communicate with the card-agent over a standard protocol and implementing a web server for connecting to a web browser operating on the host device thereby allowing a user to interact with the host agent and a web client for initiating connections to a remote server; and
wherein the trigger program causes the host-computer central processing unit to execute the host-agent.

24. The secure portable electronic device of claim 23 wherein the secure portable electronic device further comprises a secure memory partition having stored therein sensitive information, and wherein the card-agent comprises instructions to cause the card central processing unit to receive from the host agent requests requiring access to the sensitive information and to process such requests without divulging the sensitive information.

25. The secure portable electronic device of claim 23 wherein the standard protocol is a file based communications protocol and the host-agent contains instructions communicate with the secure portable electronic device by writing communications files in a read/write memory partition of the secure portable electronic device.

26. The secure portable electronic device of claim 23 wherein the host computer and secure portable electronic device each comprise instructions to communicate by establishing a secure channel over the file based communications protocol by writing encrypted packets as files in the file-based communications protocol.

27. A method for operating a host computer and secure portable device to jointly provide secure access to network services, comprising:
loading a host-agent program from the secure portable device into memory of the host computer;
executing a card-agent-to-host-agent association mechanism that operates to uniquely associate the host agent stored on the secure portable device with the card agent stored in the secure memory partition of the secure portable device in a manner to ensure the card-agent-to-host-agent association mechanism is configured to load with the host agent thereby identifying the host agent instance, when executing on the host computer, as the host agent instance uploaded from the secure portable device upon launching of the host agent instance uploaded from the secure portable device when the secure portable device is connected to the host computer;
executing the host-agent program on the host computer;
executing a card-agent program on the secure portable device;
establishing a secure communications channel between the host computer and the secure portable device, by executing on the host computer instructions of the host-agent program and executing on the secure portable device instructions of the card-agent program to establish a secure communications link;
executing on the host computer instructions of the host-agent program to cause transmission of requests to the secure portable device to perform functions that need accessing private data stored on the secure portable device;
executing on the host computer instructions in the form of a web server to allow interaction via web browser executing on the host computer and a web client for initiating connections to a remote server; and
executing on the secure portable device instructions to process the requests to of the host agent that need to use private data by executing instructions of the card-agent program to access and process the private data and to transmit the resulting data to the host computer.

28. The method for operating a host computer and secure portable device to jointly provide secure access to network services of claim 27 comprising:

operating instructions of the host-agent program to cause the host computer to establish a secure communications channel with the secure portable device.

29. The method of claim 27 comprising:

in response to establishing a connection between the host computer and the secure portable device, launching a trigger file to cause the execution of the host agent on the host computer.

30. The method of claim 27 comprising:

communicating between the host agent and card agent by the host agent and card agent writing files into a read-write memory partition of the secure portable device.

31. The method of claim 27 comprising:

communicating between the host agent and the card agent by the card agent writing to an interface of the secure portable device; and the host agent reading from the interface.

32. The method of claim 27 wherein executing a card-agent-linking mechanism comprises:

writing a shared secret into a memory location on the secure portable device, wherein the memory location is located within memory allocated to store the host agent prior loading the host agent onto the host computer; and providing a secure communications between the host agent and card agent by encrypting communications between the host agent and card agent using the shared secret.

33. The method of claim 32 wherein the writing of the shared secret comprises:

partitioning the shared secret into at least two parts and writing each part in non-contiguous memory space at predetermined locations using a predetermined algorithm.

34. The method of claim 27 comprising:

executing on the host computer instructions of a first portion of a user application requiring application of at least one security function; and executing on the secure portable device instructions of a second portion of the user application requiring application of at least one security function.

35. The method of claim 34 wherein:

the executing on the host computer instructions of a first portion comprises performing the functionality of a secure web server and web agent; and the executing on the secure portable device instructions of a second portion comprises performing a security function.

36. The method of claim 34 wherein:

the executing on the host computer instructions of a first portion comprises performing the functionality of a thin proxy; and the executing on the secure portable device instructions of a second portion comprises performing the functionality of a secure web server.

37. The secure portable electronic device of claim 12 wherein the card-agent-linking mechanism comprises instructions embedded into the host agent to generate the initial shared secret, to encrypt the initial shared secret with a public key of the card agent, to transmit the encrypted shared secret to the card agent with a challenge, to receive a response to the challenge decrypted by the card agent thereby confirming that the card agent is a legitimate card agent corresponding to the public key used to encrypt the initial shared secret.

38. The method of operating a host computer and portable device of claim 27 wherein the card-agent-linking mechanism comprises instructions embedded into the host agent to generate the initial shared secret, to encrypt the initial shared secret with a public key of the card agent, to transmit the encrypted shared secret to the card agent with a challenge, to receive a response to the challenge decrypted by the card agent thereby confirming that the card agent is a legitimate card agent corresponding to the public key used to encrypt the initial shared secret.

\* \* \* \* \*